(12) United States Patent
Cyr

(10) Patent No.: US 11,669,673 B2
(45) Date of Patent: Jun. 6, 2023

(54) ENCODING VARIABLE LENGTH CHARACTERS USING SIMULTANEOUS PROCESSING

(71) Applicant: Tableau Software, LLC, Seattle, WA (US)

(72) Inventor: Clark Richard Cyr, Bellevue, WA (US)

(73) Assignee: Tableau Software, LLC, Seattle, WA (US)

(*) Notice: Subject to any disclaimer, the term of this patent is extended or adjusted under 35 U.S.C. 154(b) by 0 days.

(21) Appl. No.: 17/348,284

(22) Filed: Jun. 15, 2021

(65) Prior Publication Data

US 2022/0405460 A1     Dec. 22, 2022

(51) Int. Cl.
*G06F 40/126* (2020.01)
*G06F 40/151* (2020.01)

(52) U.S. Cl.
CPC .......... *G06F 40/126* (2020.01); *G06F 40/151* (2020.01)

(58) Field of Classification Search
None
See application file for complete search history.

(56) References Cited

U.S. PATENT DOCUMENTS

| | | | |
|---|---|---|---|
| 6,701,320 B1 | 3/2004 | Marple | |
| 7,783,862 B2 | 8/2010 | Cameron | |
| 8,497,788 B1 * | 7/2013 | Miller | H03M 7/3093 341/51 |
| 10,461,772 B1 * | 10/2019 | Deng | G06F 40/126 |
| 2007/0064946 A1 * | 3/2007 | Ohkubo | H04L 9/0894 380/267 |
| 2008/0127122 A1 | 5/2008 | Greiner | |
| 2010/0020877 A1 | 1/2010 | Au et al. | |
| 2016/0020782 A1 * | 1/2016 | Ruff | G06F 40/126 341/95 |

OTHER PUBLICATIONS

International Search Report and Written Opinion for International Patent Application No. PCT/US2022/031201 dated Sep. 9, 2022, pp. 1-13.

* cited by examiner

*Primary Examiner* — Ariel Mercado
(74) *Attorney, Agent, or Firm* — John W. Branch; Branch Partners PLLC

(57) ABSTRACT

Embodiments are directed to managing character encoding. A plurality characters that are each encoded as code units based on a character code may be provided such that the code units for each character represents a code point of a character encoding scheme. An encoding model may be determined based on the character code, one or more processor features, and a target character code. Process features may be employed to transform the code units into target code units based on the encoding model such that the target code units are based on the target character code and such that the target code units encode the code point for each character. The plurality of target characters may be provided to a target stream such that each target character may be encoded as the target code units.

20 Claims, 27 Drawing Sheets

| Unicode Nicknames | Range (inclusive) |
|---|---|
| Ascii | 0x0000—0x007F |
| Greek | 0x0080—0x07FF |
| CJK | 0x0800—0xFFFF |
| Emoji | 0x0001000—0x0010FFFF<br><br>Note: Emoji range are all *possible* Unicode characters. Many numbers have not been assigned to characters yet, e.g. 0x00040000 to 0x000DFFFF are unassigned. |

| Source | Targets | | | |
|---|---|---|---|---|
| UTF-8: 1-byte code unit<br>Ascii: 1 code unit<br>Greek: 2 code units<br>CJK: 3 code units<br>Emoji: 4 code units | UTF-8 (validation)<br>Valid -> identical<br>Invalid code can result from 1, 2, 3 or 4 code units, but are always transformed into 3 code units. | UTF-16<br>ASCII: 1 code unit (200%)<br>Greek: 1 code unit (100%)<br>CJK: 1 code unit (66.67%)<br>Emoji: 2 code units (100%)<br>Invalid: 1 code unit (66.67-200%) | UTF-32<br>Ascii: 1 code unit (400%)<br>Greek: 1 code unit (200%)<br>CJK: 1 code unit (133.33%)<br>Emoji: 1 code unit (100%)<br>Invalid: 1 code unit (100% to 400%) |
| UTF-16: 2-byte code unit<br>Ascii: 1 code unit<br>Greek: 1 code unit<br>CJK: 1 code unit<br>Emoji: 2 code units | UTF-8<br>Ascii: 1 code unit (50%)<br>Greek: 2 code units (100%)<br>CJK: 3 code units (150%)<br>Emoji: 4 code units (100%)<br>Invalid: 3 code units (150%) | UTF-16 (validation)<br>Valid -> identical<br>Invalid code can only result when a code pair does not have both code units. That single code unit will be transformed into a single code unit. | UTF-32<br>Ascii: 1 code unit (200%)<br>Greek: 1 code unit (200%)<br>CJK: 1 code unit (200%)<br>Emoji: 2 code units (100%)<br>Invalid: 1 code unit (200%) |
| UTF-32: 4-byte code unit<br>Ascii: 1 code unit<br>Greek: 1 code unit<br>CJK: 1 code unit<br>Emoji: 1 code unit | UTF-8<br>Ascii: 1 code unit (25%)<br>Greek: 2 code units (50%)<br>CJK: 3 code units (75%)<br>Emoji: 4 code units (100%)<br>Invalid: 3 code units (75%) | UTF-16<br>Ascii: 1 code unit (50%)<br>Greek: 1 code units (50%)<br>CJK: 1 code units (50%)<br>Emoji: 2 code units (100%)<br>Invalid: 1 code units (50%) | UTF-32 (validation)<br>Valid -> identical<br>Invalid can only occur when a single code unit is out of bounds. That single code unit will be transformed into a single code unit. |

ENCODING VARIABLE LENGTH CHARACTERS USING SIMULTANEOUS PROCESSING

TECHNICAL FIELD

The present invention relates generally to character encoding, and more particularly, but not exclusively to employing simultaneous processing to improve encoding/decoding performance.

BACKGROUND

Organizations are generating and collecting an ever increasing amount of data. This data may be associated with disparate parts of the organization, such as, consumer activity, manufacturing activity, customer service, server logs, or the like. For various reasons, it may be inconvenient for such organizations to effectively utilize their vast collections of data. In some cases, the quantity of data may make it difficult to effectively utilize the collected data to improve business practices. In some cases, organizations may generate visualizations of the some or all of their data. Employing visualizations to represent this data may enable organizations to improve their understanding of critical business operations and help them monitor key performance indicators. In some cases, visualizations, configuration information, or other information may include character data for annotations, labeling, narratives, field names, or the like, that may be stored using various character encoding schemes. In some cases, it may be advantageous to transform characters encoded in one character code to another character code. Accordingly, it may be advantageous to reduce the resource costs that may be associated with transforming characters on-the-fly or otherwise. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein:

FIG. 11 illustrates a summary of a portion of a character encoding standard that may be in accordance with one or more of the various embodiments;

DETAILED DESCRIPTION OF VARIOUS EMBODIMENTS

Figure 1:
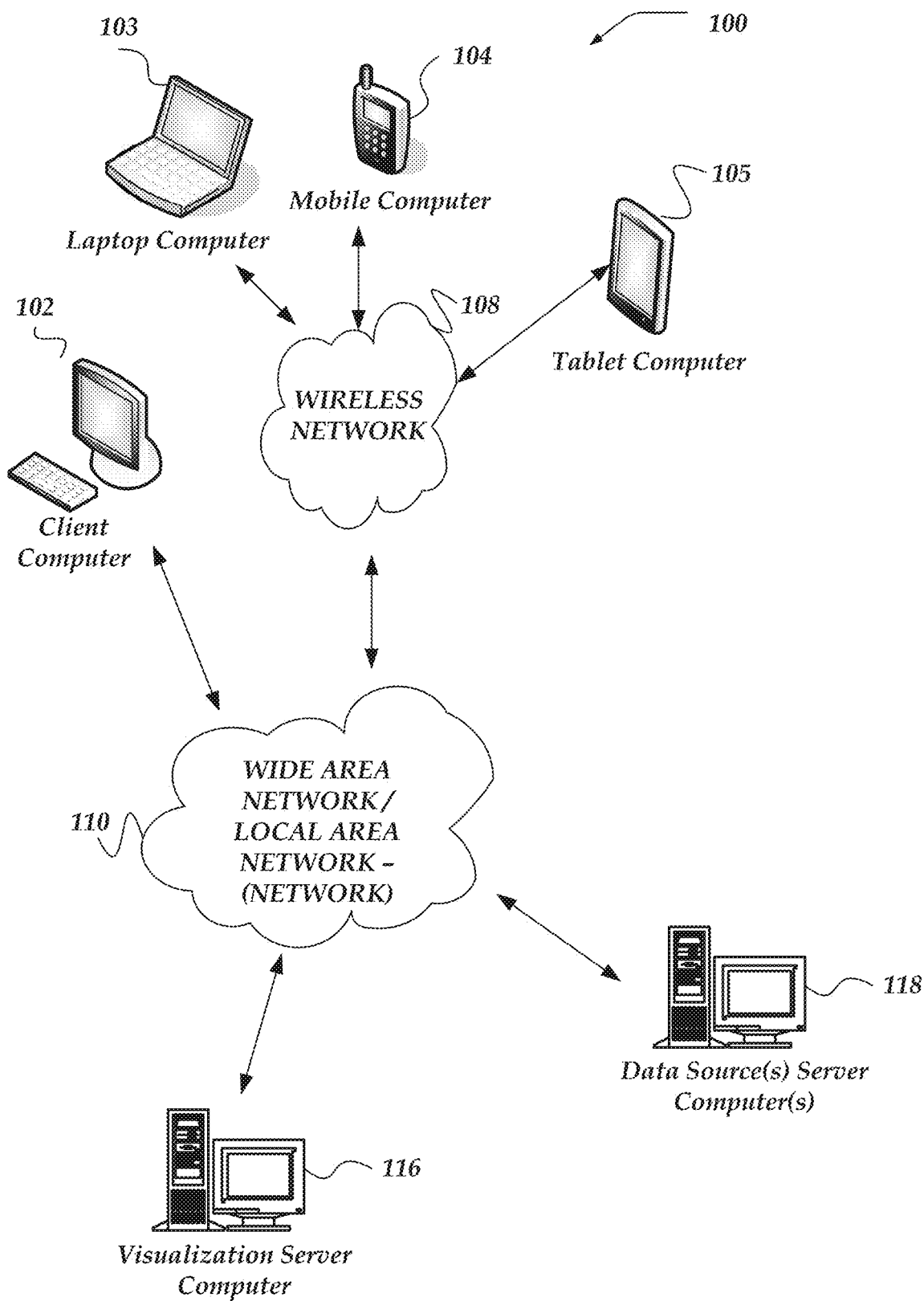
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL™, Java™, PHP™, Perl™, JavaScript™, Ruby™, VBScript™, Microsoft .NET™ languages such as C#, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein, the term "data source" refers to databases, applications, services, file systems, or the like, that store or provide information for an organization. Examples of data sources may include, RDBMS databases, graph databases, spreadsheets, file systems, document management systems, local or remote data streams, or the like. In some cases, data sources are organized around one or more tables or table-like structure. In other cases, data sources be organized as a graph or graph-like structure.

As used herein the term "data model" refers to one or more data structures that provide a representation of one or more portions of an underlying data source. In some cases, data models may provide views of a data source for particular applications. Data models may be considered views or interfaces to underlying data sources. In some cases, data models may map directly to a data source (e.g., practically a logical pass through). Also, in some cases, data models may be provided by a data source. Data models enable organizations to organize or present information from data sources in ways that may be more convenient, more meaningful (e.g., easier to reason about), safer, or the like.

As used herein the term "data object" refers to one or more data structures that comprise data models. In some cases, data objects may be considered portions of the data model. Data objects may represent individual instances of items or classes or kinds of items.

As used herein the term "panel" refers to region within a graphical user interface (GUI) that has a defined geometry (e.g., x, y, z-order) within the GUI. Panels may be arranged to display information to users or to host one or more interactive controls. The geometry or styles associated with panels may be defined using configuration information, including dynamic rules. Also, in some cases, users may be enabled to perform actions on one or more panels, such as, moving, showing, hiding, re-sizing, re-ordering, or the like.

As used herein the term "visualization model" refers to one or more data structures that represent one or more representations of a data model that may be suitable for use in a visualization that is displayed on one or more hardware displays. Visualization models may define styling or user interface features that may be made available to non-authoring user.

As used herein the term "display object" refers to one or more data structures that comprise visualization models. In some cases, display objects may be considered portions of the visualization model. Display objects may represent individual instances of items or entire classes or kinds of items that may be displayed in a visualization. In some embodiments, display objects may be considered or referred to as views because they provide a view of some portion of the data model.

As used herein the terms "character encoding," "character encoding scheme," or "encoded characters" refer to computer readable information that may be used to represent characters for use in display or information processing. Character encoding schemes may be employed to map characters from one or more human languages to computer readable values. Also, character encoding may be used to map symbols, glyphs, emojis, or the like, to computer readable values. Standardized character encoding enables different computer applications or services to map computer readable values to the same/correct characters. For example, Unicode is a character encoding standard that has been embraced in many computer applications to enable characters to be represented consistently across different applications or services.

As used herein the term "code point" refers to the encoded value for a particular character for a given character encoding. For example, a code point for a character encoding scheme may reference a particular character, glyph, or symbol.

As used herein the term "character code" refers to an encoding scheme for encoding code points for a character encoding scheme. For example, UTF-8, UTF-16, and UTF-32 are character codes for representing Unicode code points.

As used herein the term "code unit" refers to a minimum size word or element of a character code used to represent code points for a character encoding scheme. For example: UTF-8 has 8-bit code units; UTF-16 has 16-bit code units; and UTF-32 has 32-bit code units.

As used herein the term "encoding model" refers to data structures that include or define rules, instructions, code, that perform operations to transform characters that are encoded in one or more character codes into characters that are encoded in one or more other character codes. Encoding models may include one or more signatures, patterns, instructions, conditions, or the like, for distinguishing one character code from another. Likewise, encoding models may include signatures, patterns, instructions, conditions, or the like, for confirming or validating character codes. Accordingly, if new or additional character codes are anticipated, one of ordinary skill in the art may provide encoding models that support the new or additional character codes.

As used herein the term "processor features," "parallel processing features" refer to specialized instructions, registers, APIs, or the like, that enable parallel processing. In some cases, processors may have more or fewer processor features. In some cases, different processors may have different processors features. Likewise, in some cases, some processors may have no processor features that provide support for parallel processing.

As used herein the term "configuration information" refers to information that may include rule based policies, pattern matching, scripts (e.g., computer readable instructions), or the like, that may be provided from various sources, including, configuration files, databases, user input, built-in defaults, or the like, or combination thereof.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to managing character encoding using one or more network computers that include one or more processors. In one or more of the various embodiments, a plurality characters that are each encoded as one or more code units based on a character code may be provided such that the one or more code units for each character represents a code point of a character encoding scheme.

In one or more of the various embodiments, one or more processor features in the one or more processors may be determined such that the one or more processor features may enable parallel processing of the one or more code units at the same time the one or more processors.

In one or more of the various embodiments, an encoding model may be determined based on the character code, the one or more processor features, and a target character code.

In one or more of the various embodiments, the one or more processor features may be employed to transform the one or more code units into one or more target code units that are stored in the one or more processor features based on the encoding model such that the one or more target code units are based on the target character code and such that the one or more target code units encode the code point for each character.

In one or more of the various embodiments, the plurality of target characters may be provided to a target stream such that each target character may be encoded as the one or more target code units.

In one or more of the various embodiments, employing the one or more processor features to transform the one or more code units into the one or more target code units may include: determining one or more instructions based on the encoding model; and executing the one or more instructions to simultaneously transform one or more portions of the one or more code units into a portion of the one or more target code units.

In one or more of the various embodiments, transforming of the one or more code units into the one or more target code units may include: loading a first register with a first portion of the one or more code units such that each code unit is two bytes wide; loading a second register with a second portion of the one or more code units such that each code unit is two bytes wide and such that the second register is the same width as the first register; and providing the one or more target code units based on packing the first portion of the one or more code units and the second portion of the one or more code units into a third register such that each target code unit is one byte wide, and wherein the third register is the same width as the first register.

In one or more of the various embodiments, transforming the one or more code units into the one or more target code units may include: loading the one or more code units into a register such that each code unit is one byte wide and such that three or more code units are used to encode each code point that represents each character; and generating the one or more target code units in the register based on the encoding model such that each target code units is two bytes wide and such that each target code unit encodes the code point that represents each character.

In one or more of the various embodiments, the character encoding scheme is Unicode such that the character code is one or more of Unicode Transformation Format—8 bits (UTF-8), Unicode Transformation Format—16 bits (UTF-16), or Unicode Transformation Format—32 bits (UTF-32) and such that the target character code is one or more of UTF-8, UTF-16, or UTF-32.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)—(network) 110, wireless network 108, client computers 102-105, visualization server computer 116, data source server computer 118, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript™, HyperText Markup Language (HTML™), eXtensible Markup Language (XML™), JavaScript Object Notation (JSON™), Cascading Style Sheets (CSS™), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, visualization server computer 116, data source server computer 118, or other computers.

Client computers 102-105 may further be configured to include a client application that enables an end-user to log into an end-user account that may be managed by another computer, such as visualization server computer 116, data source server computer 118, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Also, client computers may be arranged to enable users to display reports, interactive user-interfaces, or results provided by visualization server computer 116, data source server computer 118.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, wireless local area network (WLAN™), Wireless Router (WR™) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobile communication (GSM™), General Packet Radio Services (GPRS™) Enhanced Data GSM Environment (EDGE™), code division multiple access (CDMA™), time division multiple access (TDMA™), Wideband Code Division Multiple Access (WCDMA™), High Speed Downlink Packet Access (HSDPA™), Long Term Evolution (LTE™), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, visualization server computer 116, data source server computer 118, client computers 102, and client computers 103-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

Also, one embodiment of visualization server computer 116, data source server computer 118 are described in more detail below in conjunction with FIG. 3. Although FIG. 1 illustrates visualization server computer 116, data source server computer 118, or the like, each as a single computer, the innovations or embodiments are not so limited. For example, one or more functions of visualization server computer 116, data source server computer 118, or the like, may be distributed across one or more distinct network computers. Moreover, in one or more embodiments, visualization server computer 116, data source server computer 118 may be implemented using a plurality of network computers. Further, in one or more of the various embodiments, visualization server computer 116, data source server computer 118, or the like, may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
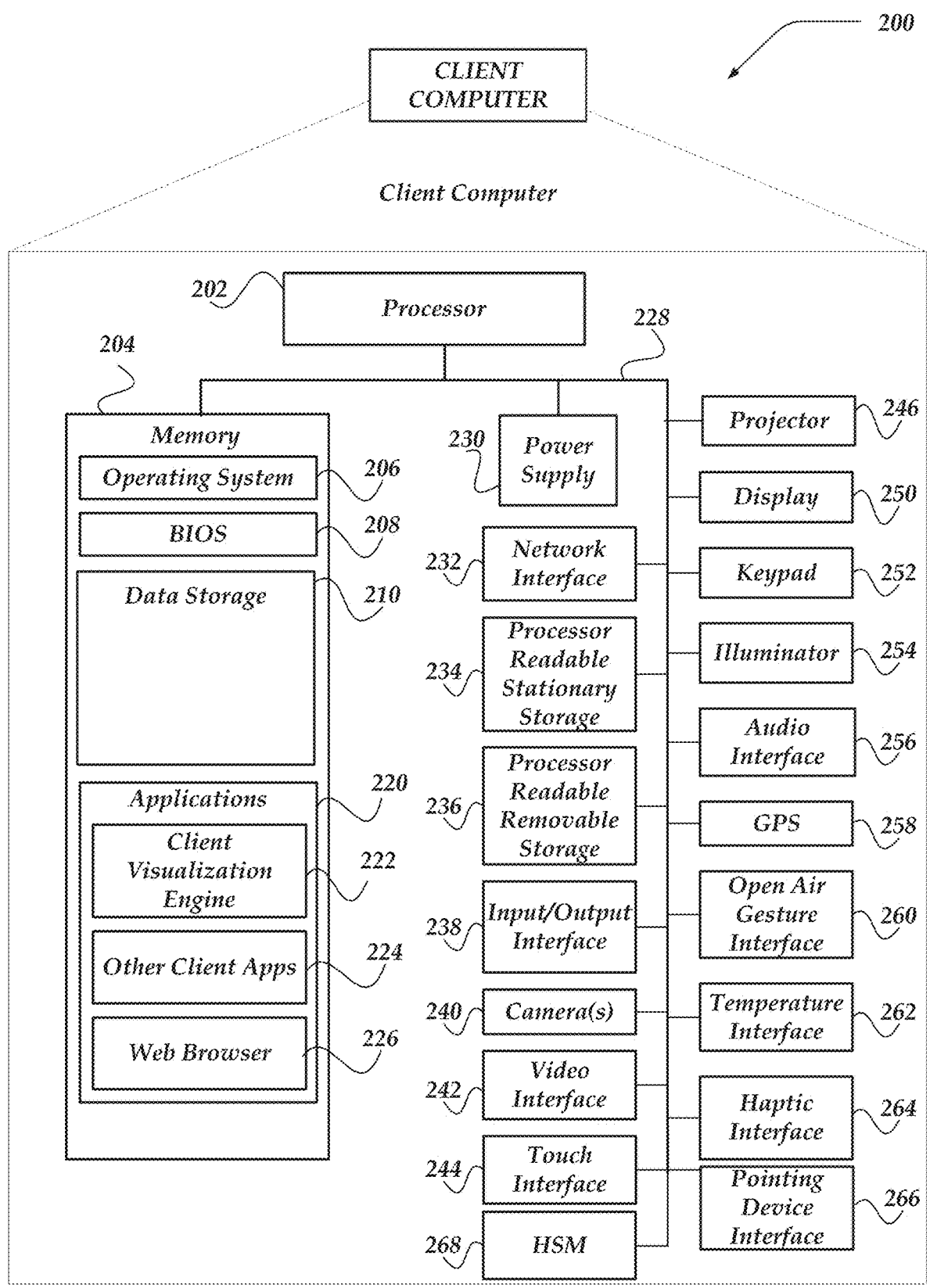
FIG. 2 illustrates a schematic embodiment of a client computer.

FIG. 2 shows one embodiment of client computer 200 that may include many more or less components than those shown. Client computer 200 may represent, for example, one or more embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication, GSM™, CDMA™, time division multiple access (TDMA™), UDP™, TCP/IP™, SMS™, MMS™, GPRS™, WAP™, UWB™ WiMax™ (Worldwide Interoperability for Microwave Access)™, SIP/RTP™, GPRS™, EDGE™, WCDMA™, LTE™, UMTS™, OFDM™, CDMA2000™, EV-DO™, HSDPA™, or any of a variety of other wireless communication protocols. Network interface 232 is sometimes known as a transceiver, transceiving device, or network interface card (NIC).

Audio interface 256 may be arranged to produce and receive audio signals such as the sound of a human voice. For example, audio interface 256 may be coupled to a speaker and microphone (not shown) to enable telecommunication with others or generate an audio acknowledgment for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may back-light the buttons on keypad 252 and stay on while the client computer is powered. Also, illuminator 254 may back-light these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geopositioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiments, however, client computer 200 may, through other components, provide other information that may be employed to determine a physical location of the client computer, including for example, a Media Access Control (MAC) address, IP address, and the like.

In at least one of the various embodiments, applications, such as, operating system 206, other client apps 224, web browser 226, or the like, may be arranged to employ geo-location information to select one or more localization features, such as, time zones, languages, currencies, calendar formatting, or the like. Localization features may be used in display objects, data models, data objects, user-interfaces, reports, as well as internal processes or databases. In at least one of the various embodiments, geo-location information used for selecting localization information may be provided by GPS 258. Also, in some embodiments, geolocation information may include information provided using one or more geolocation protocols over the networks, such as, wireless network 108 or network 111.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP™), and the like. In one or more embodiments, the browser application is enabled to employ Handheld Device Markup Language (HDML™), Wireless Markup Language (WML™), WMLScript™, JavaScript™, Standard Generalized Markup Language (SGML™), HyperText Markup Language (HTML™), eXtensible Markup Language (XML™), HTML5™, and the like."

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX™, or Linux™, or a specialized client computer communication operating system such as Windows Phone™, or the Symbian® operating system. The operating system may include, or interface with a Java™ virtual machine module that enables control of hardware components or operating system operations via Java™ application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, client visualization engine 222, other client applications 224, web browser 226, or the like. Client computers may be arranged to exchange communications one or more servers.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, visualization applications, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), client computer 200 may include one or more hardware micro-controllers instead of CPUs. In one or more embodiments, the one or more micro-controllers may directly execute their own embedded logic to perform actions and access its own internal memory and its own external Input and Output Interfaces (e.g., hardware pins or wireless transceivers) to perform actions, such as System On a Chip (SOC), or the like.

Illustrative Network Computer

Figure 3:
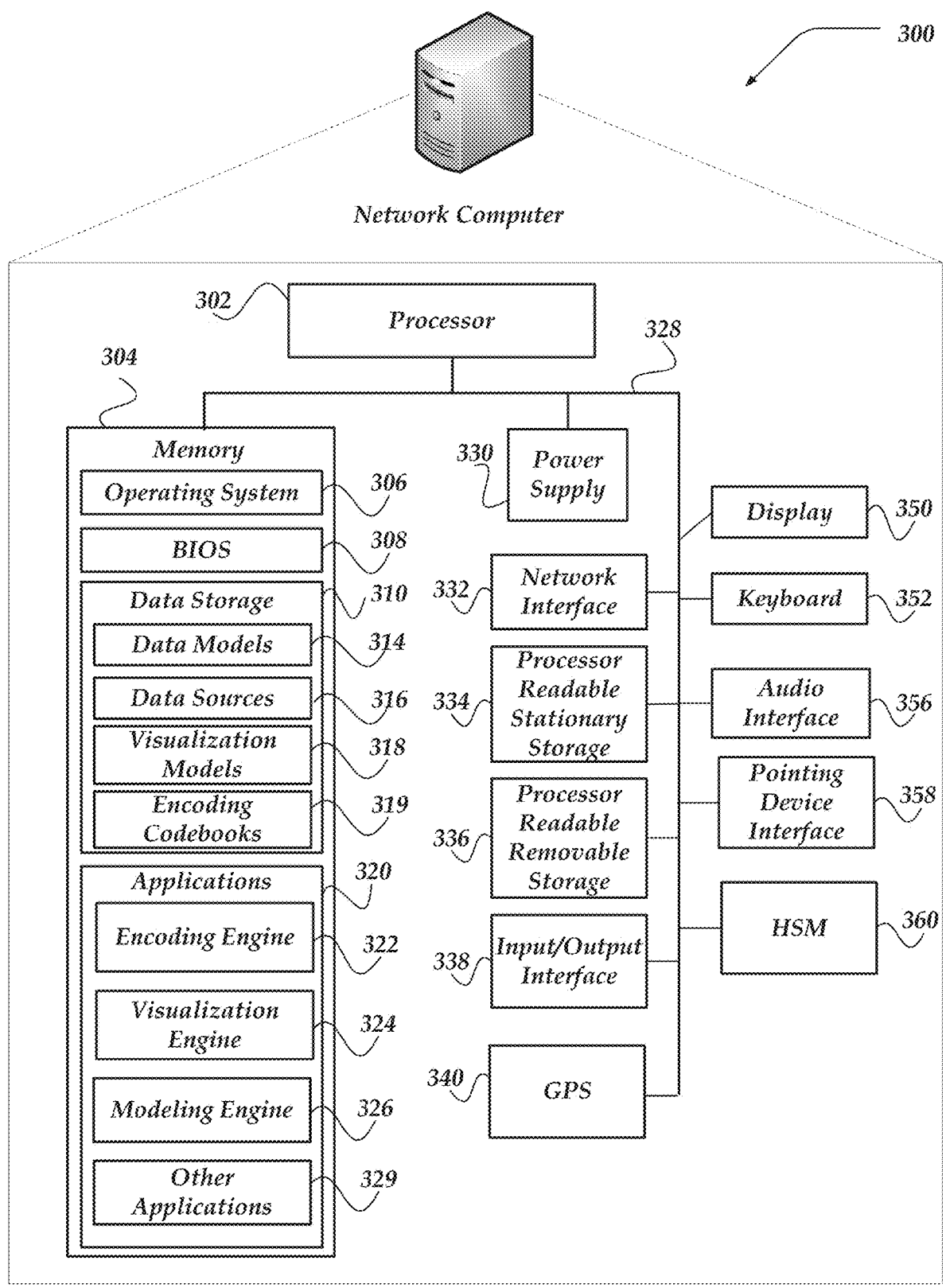
FIG. 3 illustrates a schematic embodiment of a network computer.

FIG. 3 shows one embodiment of network computer 300 that may be included in a system implementing one or more of the various embodiments. Network computer 300 may include many more or less components than those shown in FIG. 3. However, the components shown are sufficient to disclose an illustrative embodiment for practicing these innovations. Network computer 300 may represent, for example, one embodiment of at least one of visualization server computer 116, data source server computer 118, or the like, of FIG. 1.

Network computers, such as, network computer 300 may include a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Further, in some embodiments, processors, such as, processor 302 may support or provide one or more process features that enable parallel processing of various sized data or data types. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA™), time division multiple access (TDMA™), user datagram protocol (UDP™), transmission control protocol/Internet protocol (TCP/IP™), Short Message Service (SMS™), Multimedia Messaging Service (MMS™), general packet radio service (GPRS™), wireless application protocol (WAP™), ultra-wide band (UWB™), IEEE 802.16 Worldwide Interoperability for Microwave Access (WiMax™), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgment for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi™, WiMax™, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiments, however, network computer 300 may, through other components, provide other information that may be employed to determine a physical location of the client computer, including for example, a Media Access Control (MAC) address, IP address, and the like.

In at least one of the various embodiments, applications, such as, operating system 306, encoding engine 322, visualization engine 324, modeling engine 326, other applications 329, or the like, may be arranged to employ geo-location information to select one or more localization features, such as, time zones, languages, currencies, currency formatting, calendar formatting, or the like. Localization features may be used in user interfaces, dashboards, visualizations, reports, as well as internal processes or databases. In at least one of the various embodiments, geo-location information used for selecting localization information may be provided by GPS 340. Also, in some embodiments, geolocation information may include information provided using one or more geolocation protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX™, or Linux®, or a specialized operating system such as Microsoft Corporation's Windows® operating system, or the Apple Corporation's OSX® operating system. The operating system may include, or interface with one or more virtual machine modules, such as, a Java™ virtual machine module that enables control of hardware components or operating system operations via Java™ application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, data models 314, data sources 316, visualization models 318, assessment models 319, or the like.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include encoding engine 322, visualization engine 324, modeling engine 326, other applications 329, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, encoding engine 322, visualization engine 324, modeling engine 326, other applications 329, or the like, may be operative in a cloud-based computing environment. In one or more of the various embodiments, these applications, and others, that comprise the management platform may be executing within virtual machines or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to encoding engine 322, visualization engine 324, modeling engine 326, other applications 329, or the like, may be provisioned and de-commissioned automatically.

Also, in one or more of the various embodiments, encoding engine 322, visualization engine 324, modeling engine 326, other applications 329, or the like, may be located in virtual servers running in a cloud-based computing environment rather than being tied to one or more specific physical network computers.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of a CPU. In one or more embodiments, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
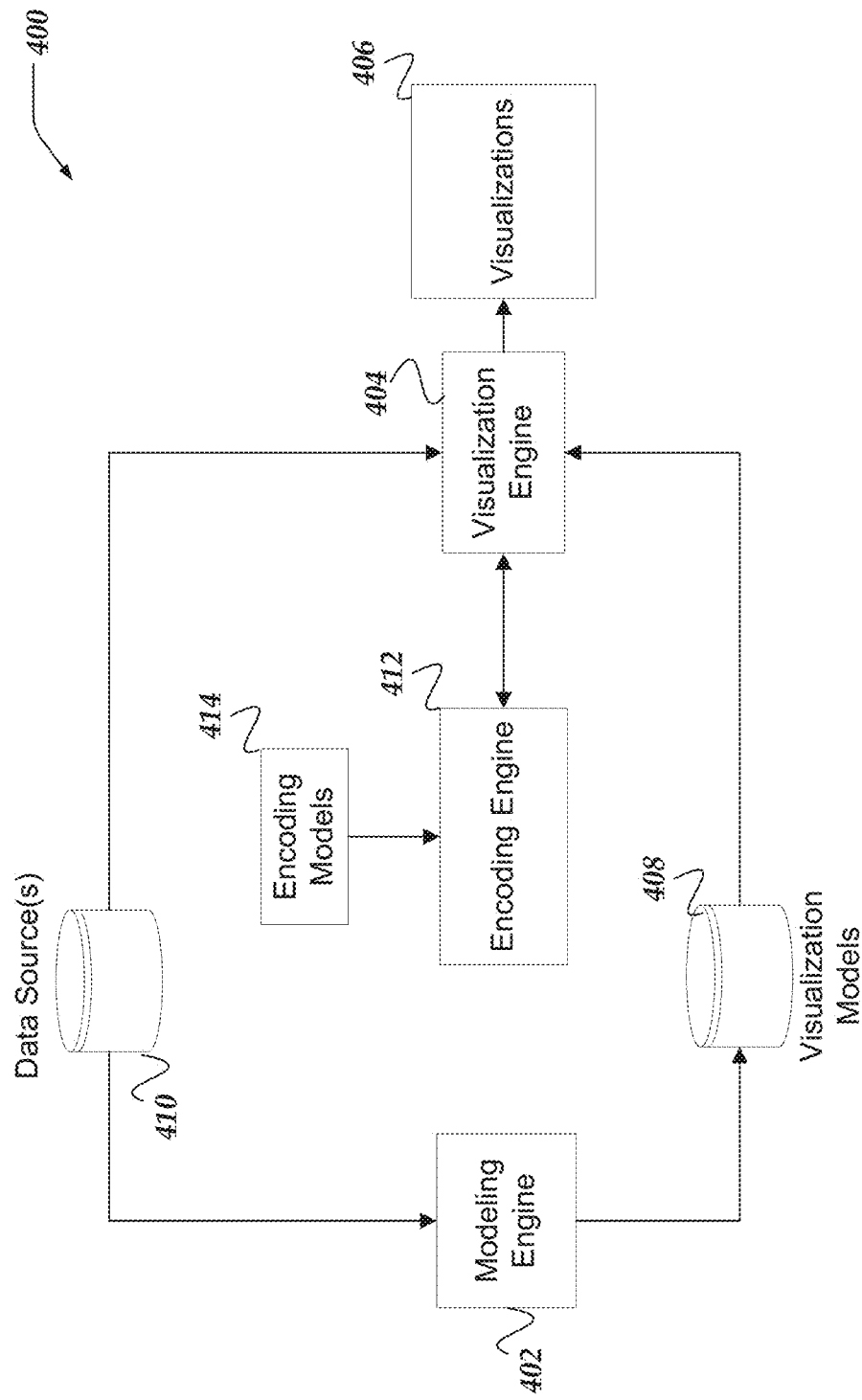
FIG. 4 illustrates a logical architecture of a system for encoding variable length characters using simultaneous processing in accordance with one or more of the various embodiments.

FIG. 4 illustrates a logical architecture of system 400 for encoding variable length characters using simultaneous processing in accordance with one or more of the various embodiments. In one or more of the various embodiments, system 400 may be comprised of various components, including, one or more modeling engines, such as, modeling engine 402; one or more visualization engines, such as, visualization engine 404; one or more visualizations, such as, visualization 406; one or more data sources, such as, data source 410; one or more visualization models, such as, visualization models 408; one or more encoding engines, such as, encoding engine 412; or one or more encoding models, such as, encoding models 414.

In one or more of the various embodiments, modeling engine 402 may be arranged to enable users to design one or more visualization models that may be provided to visualization engine 404. Accordingly, in one or more of the various embodiments, visualization engine 404 may be arranged to generate one or more visualizations based on the visualization models.

In one or more of the various embodiments, modeling engines may be arranged to access one or more data sources, such as, data source 410. In some embodiments, modeling engines may be arranged to include user interfaces that enable users to browse various data source information, data objects, or the like, to design visualization models that may be used to generate visualizations of the information stored in the data sources.

Accordingly, in some embodiments, visualization models may be designed to provide visualizations that include charts, plots, graphs, tables, graphics, styling, explanatory text, interactive elements, user interface features, or the like. In some embodiments, users may be provided a graphical user interface that enables them to interactively design visualization models such that various elements or display objects in the visualization model may be associated with data from one or more data sources, such as, data source 410.

In one or more of the various embodiments, data sources, such as, data source 410 may include one or more of databases, data stores, file systems, or the like, that may be located locally or remotely. In some embodiments, data sources may be provided by another service over a network. In some embodiments, there may be one or more components (not shown) that filter or otherwise provide management views or administrative access to the data in a data source.

In one or more of the various embodiments, visualization models may be stored in one or more data stores, such as, visualization model storage 408. In this example, for some embodiments, visualization model storage 408 represents one or more databases, file systems, or the like, for storing, securing, or indexing visualization models.

In one or more of the various embodiments, visualization engines, such as, visualization engine 404 may be arranged to parse or otherwise interpret the visualization models and data from data sources to generate one or more visualizations that may be displayed to users.

In one or more of the various embodiments, visualization models, data models, or visualizations may be arranged to include encoded characters that may be employed for annotations, labeling, narratives, configuration information, or the like. In some embodiments, the characters stored in data models, visualization models, data sources, or the like, may be encoded using a character code that may require decoding or conversion to a different character code before the characters may be displayed on a display device. Accordingly, in some embodiments, visualization engines, or the like, may be arranged to employ encoding engines, such as, encoding engine 412 to encode or decode characters.

Accordingly, in some embodiments, visualization engines, or the like, may be arranged to selectively encode or decode characters from one character code to another character code. In some embodiments, visualization engines or encoding engines may be arranged to employ one or more tests or comparisons to determine the character code being used in sources to determine if that character code may be compatible with one or more targets. For example, in some embodiments, sources or targets may include one or more of data sources, data models, visualization models, configuration information, display systems, or the like.

In one or more of the various embodiments, encoding engines may be arranged to employ encoding models for identifying character codes. Likewise, in one or more of the various embodiments, encoding engines may be arranged to employ encoding models to transform characters from one or more character codes to one or more other character codes. For example, in some embodiments, a visualization platform may be arranged to support one or more UNICODE character codes, such as, UTF-8, UTF-16, UTF-32, or the like. However, while Unicode character codes may be conventionally employed in many systems, one of ordinary skill in the art will appreciate that other encoding standards or character codes may be employed without departing from the scope of the innovations disclosed herein. Accordingly, in some embodiments, one or more encoding models may be provided to account for different character codes, availability of operating system features, availability of processor features, local circumstances, local requirements, or the like.

In one or more of the various embodiments, encoding models may be determined on-the-fly based on parameters or arguments provided by configuration information, or the like. Also, in some embodiments, one or more encoding models may include rules, instructions, pattern matching, or the like, that may test if characters may be encoded with character codes supported by a given encoding model. For example, in some embodiments, an encoding model for transforming ASCII characters encoded in UTF-16 to UTF-8 may confirm that the first byte of a UTF-16 word is set to zero and that the second byte of the word is a valid ASCII value to confirm that provided characters may be transformed by the encoding model.

In one or more of the various embodiments, encoding models may enable various conventional or custom character codes to be supported by encoding engine 412, or the like. Thus, in some embodiments, as new or additional character codes may be introduced, corresponding encoding models may be provided to support the new or additional characters.

Figure 5:
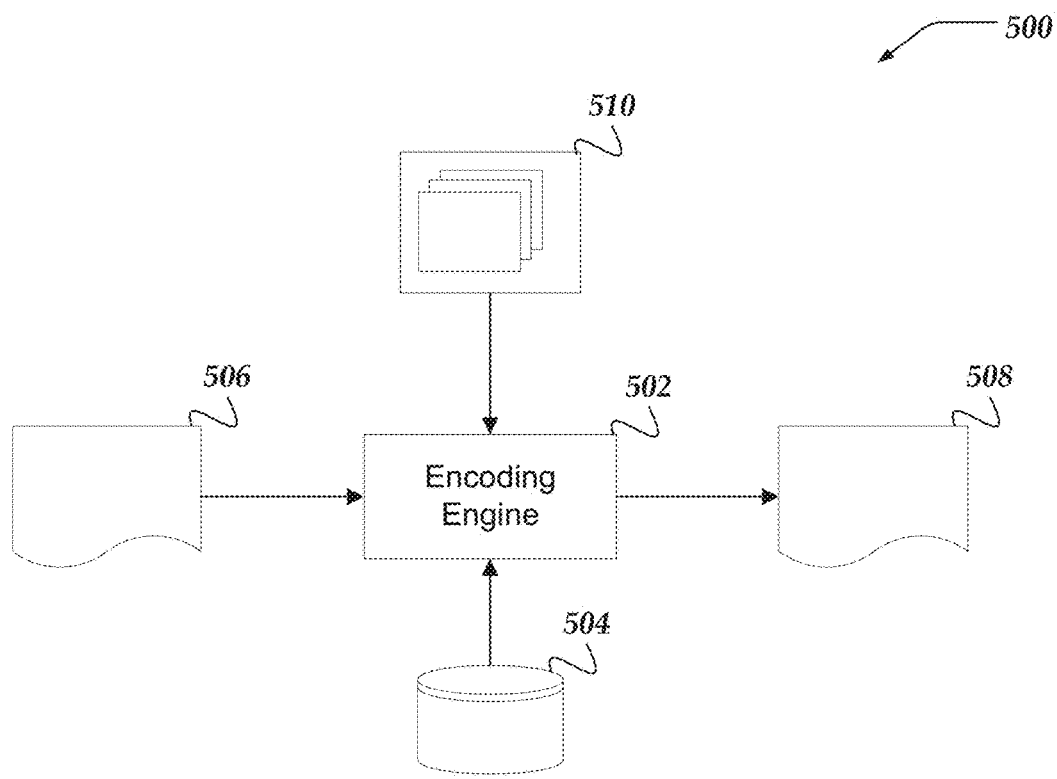
FIG. 5 illustrates a logical schematic of a portion of a system for encoding variable length characters using simultaneous processing in accordance with one or more of the various embodiments.

FIG. 5 illustrates a logical schematic of a portion of system 500 for encoding variable length characters using simultaneous processing in accordance with one or more of the various embodiments. In one or more of the various embodiments, system 500 may include: encoding engine 502 for encoding, decoding, or converting characters from one character code to another; encoding models 510, for providing the particular rules, instructions, and so on, for performing character code validations or transformations; one or more data stores, such as, data store 504 for storing character maps, code point tables, or the like. Further, in this example, source stream 506 represents characters being provided to encoding engine 502 for encoding or decoding and target stream 508 represents characters that may have been transform from one character code to another character code by encoding engine 502.

In one or more of the various embodiments, encoding engines may be arranged to receive a stream of source characters, represented here by source stream 506. Accordingly, in some embodiments, encoding engines may be arranged to employ encoding models to evaluate the incoming characters provided by the source stream 506. In one or more of the various embodiments, if one or more encoding models support the requested transformation, encoding engine 502 may be arranged to employ one or more character code books, or the like, that may be stored in data store 504 to map the source characters provided by source stream 506 to target characters that may be provided to target stream 508.

In one or more of the various embodiments, encoding engine 502 may be arranged to employ one or more encoding models to automatically determine the particular character codes used for source characters or target characters based on one or more rules, instructions, patterns, or the like, included in the encoding models.

In some embodiments, encoding engines may be arranged to determine the available encoding models based on configuration information. For example, in some embodiments, various character codes may define one or more markers or signals in some characters that enable encoding engines or encoding models to identify different character codes from encoded characters. Alternatively, in some embodiments, the character codes for characters may be determined based on the source stream or the target stream. For example, in some embodiments, source streams may provide characters from one or more documents or document portions that include metadata that may identify the character codes of interest.

In one or more of the various embodiments, one or more of source stream 506 or target stream 508 may be configured to support character codes that may use a variable number of bytes or words to represent characters. In some embodiments, character codes may be arranged to compose characters using one or more code units depending on the character being represented. For example, a character code that supports a limited number of characters, such as, ASCII may require fewer code values than other character codes that may support more or different characters, such as, character codes that may support languages that include one or more characters that are not supported by ASCII.

One of ordinary skill in the art will be familiar one or more standard character encoding standards, such as, Unicode and its character codes, such as, UTF-8, UTF-16, and UTF-32. Accordingly, for brevity and clarity some terminology from this familiar character encoding scheme may be employed herein. For example, the code points may be considered to be specific values that may be used to identify characters in a character code book similar to the definition provided by Unicode. Likewise, in some embodiments, the term code unit may be used to represent the minimum amount of memory to represent a character with a particular character code. For example, the well-known variable length character code UTF-8 is a character code that has 8-bit code units while the well-known variable length character code UTF-16 has 16-bit code units.

In one or more of the various embodiments, variable length character codes may be arranged to require additional code units to represent some characters. For example, a character code that has 8-bit code units can represent 256 values with a single code unit. For example, UTF-8 may represent ASCII values with a single code unit, however, to represent characters outside of ASCII additional code units are required. Likewise, in some embodiments, UTF-16 has 16-bit code units enabling a single UTF-16 code unit to represent more characters than a single UTF-8 code unit. However, in some embodiments, code units may be combined into ordered sequences enabling more characters to be represented. Thus, for example, the UTF-8 character code can represent the same number of characters as UTF-16 or UTF-32 by using more code units. Accordingly, in some embodiments, one or more code units for a given character code may be combined to represent a code point that may be used to identify a particular character in a character code book is needed. Note, for completeness, the character code UTF-32 also encodes Unicode characters using 32-bit code units that each may store a complete code point that maps to a Unicode character. In contrast, UTF-8 may require up to 4 code units to represent the single characters that one UTF-32 code unit represents. Likewise, UTF-16 may require up to two 16-bit code units to represent the same character as a single UTF-32 code unit.

In one or more of the various embodiments, variable length character codes may be arranged to minimize or reduce the number code units required to represent some characters. For example, in Unicode the first 128 code points represent ASCII characters, thus a single UTF-8 code unit of 8-bits (one byte) can be used to represent standard ASCII characters. In contrast, for example, UTF-16 requires 16-bits (two bytes) to represent each ASCII character and UTF-32 requires 32-bits to represent each ASCII character. Also, for example, in some cases, UTF-8 requires three code units for Japanese characters; UTF-16 requires only one code unit. Thus UTF-16 may use less memory (2 bytes) than UTF-8 (3 bytes) in this circumstance. Accordingly, depending on the circumstances UTF-8 may or may not use less memory than UTF-16. Note also UTF-32 never uses less memory than UTF-8 or UTF-16, always being greater than or equal (and equal is rarely true, only when all code points have values greater than 16 bits).

Accordingly, in some embodiments, it may be advantageous to convert between character codes that have different code units for various reasons depending on the application or local circumstances. For example, employing character codes with larger code units enable larger character sets to be encoded in one code unit. However, in some embodiments, if the code points for the characters being encoded can fit into smaller code units, using larger code units may use more memory than necessary because the larger code units are not required to represent the characters of interest. For example, if all or most of the characters used by a visualization platform are ASCII characters, using a character code that has code units larger than 8-bits may be disadvantageous if memory or storage space is of concern. Also, in some embodiments, visualization platforms may be arranged to use character codes with larger code units when storing characters if the cost of data storage is inexpensive, such as, when storing files on file systems. However, in some embodiments, if characters code encoded with larger code units are stored in expensive or scarce memory, using character codes with larger than necessary code units may be disadvantageous.

Additionally, in one or more of the various embodiments, reducing the amount of memory or number of bytes may reduce the expense of transmitting streams of characters over one or more networks. For example, transmitting an XML, file/stream comprised entirely of Ascii characters (which is common in XML) requires half the memory in UTF-8 as in UTF-16, which may be half again as expensive as UTF-32. Thus, reducing the amount of transmitted data by two or four times may reduce the time it may take complete the transmission or reduce the cost to complete the transmission.

Accordingly, in one or more of the various embodiments, visualization engines, or the like, may be arranged to employ encoding engines to convert between different character codes. For example, in some embodiments, a visualization platform may be arranged to encode characters stored in files using UTF-16 and then convert the encoded characters to UTF-8 if they are read into scarce or expensive memory (e.g., RAM) as part of generating visualizations.

Figure 6:
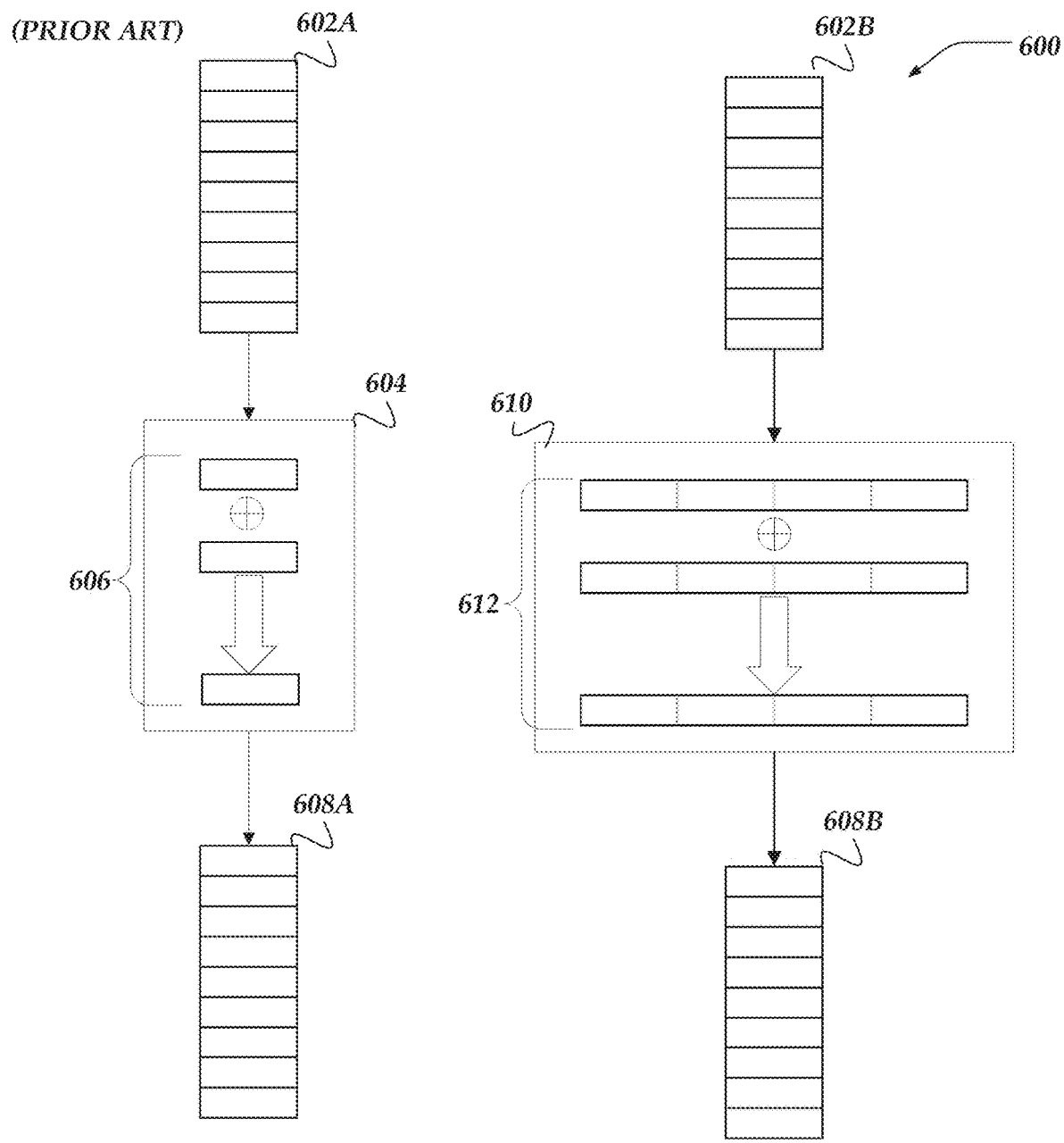
FIG. 6 illustrates a logical schematic of a portion of an encoding engine for encoding variable length characters using simultaneous processing in accordance with one or more of the various embodiments.

FIG. 6 illustrates a logical schematic of a portion of encoding engine 600 for encoding variable length characters using simultaneous processing in accordance with one or more of the various embodiments.

As described above, in one or more of the various embodiments, encoding engines may be arranged to encode or decode various character codes. In some embodiments, encoding engines may be arranged to transform characters from one or more character codes to one or more another character codes.

In this example, for some embodiments, character stream 602A and 602B may represent a source stream of encoded characters. In some embodiments, character stream 602A and 602B may be considered an I/O stream provided by one or more other services or processes (e.g., operating systems, file systems, network stacks, or the like).

In conventional encoding engines, character streams may be processed using CPU registers that correspond to the word-size of the CPU. For example, in some embodiments, the word-size of a 32-bit CPU may be 32-bits or the word-size of a 64-bit CPU may be 64-bits. In some embodiments, conventionally, characters from character streams may be processed code unit by code unit. Thus, in some prior art embodiments, code units may be decoded/encoded one code unit at a time. Typically, this requires looping through each individual code unit such each code unit may be evaluated individually until each code point is decoded/encoded. Accordingly, overall encoding/decoding performance may be impacted by one or more cache misses, jumps, branching, or the like, that may be inherent in processing code units individually.

In contrast, some CPUs may support one or more processor features that may provide specialized data paths that provide physical or logical wide registers that may be larger than the CPU word-size. For example, a CPU with 64-bit word-size may provide a wider data path that provides 128-bit registers, herein referred to as wide registers, rather than being limited to 64-bit registers. Thus, in this example, if wide registers are employed, a CPU may process 128-bits with one operation rather than being limited to processing a single code unit. Further, some CPUs may provide specialized APIs, instruction sets, or the like, that may support parallel processing on data stored in one or more registers or similar locations in processors.

In this example, conventional encoding engine 604 may enable character codes to be processed code unit by code unit. Accordingly, in this example, word 606 represents the processing of code units sequentially, loading them into a single code point before transforming into the target code unit(s). In one or more of the various embodiments, conventional encoding engine 604 may be enabled to decode/encode characters from character stream 602A into characters for character stream 608A.

In contrast, in some embodiments, encoding engine 610 may be arranged to employ processor features that may take advantage of wide data paths, physical wide registers, logical wide registers, or the like, rather than being limited to conventional CPU data paths. For example, in some embodiments, more code units may be loaded into wide registers, such as, wide registers 612. Thus, in some embodiments, more code units may be processed at the same time in parallel. In this example, wide registers 612 may be considered to a have a size/length of four conventional registers (e.g., registers 606). Thus, for the UTF-8, a 128-bit wide register can process 16 code units in parallel; a 512-bit wide register can process 64 UTF-8 code units in parallel. And while UTF-16 and UTF-32 scale down by factors of 2 and 4 respectively, processing UTF-16 or UTF-32 code units may be significantly faster than processing each code unit sequentially. In some embodiments, if encoding engine 610 employs wide registers, such as, wide registers 612 to transform encoded characters, they may be provided to conventional output streams, such as output stream 608B similar to conventional encoding engines.

Note, in this example, for brevity and clarity, conventional encoding engine 604 and encoding engine 610 are illustrated as using three registers. One of ordinary skill in the art will appreciate that CPUs may include several registers, including one or more general purpose registers or one or more specialized/limited purpose registers. However, registers 606 and wide registers 612 are at least sufficient for disclosing the innovations disclosed herein.

In one or more of the various embodiments, encoding engines may be arranged to determine the availability of processor features that support parallel processing. In some embodiments, encoding engine may employ APIs, system calls, configuration information, to determine the features supported by a given CPU. Accordingly, in some embodiments, encoding engines may be arranged to select from among different instructions or encoding models based on the capability of the CPUs. For example, if a CPU does not provide processor features that support parallel operations, encoding engine may be arranged to select encoding models that employ sequential operations rather than parallel operations.

Figure 7:
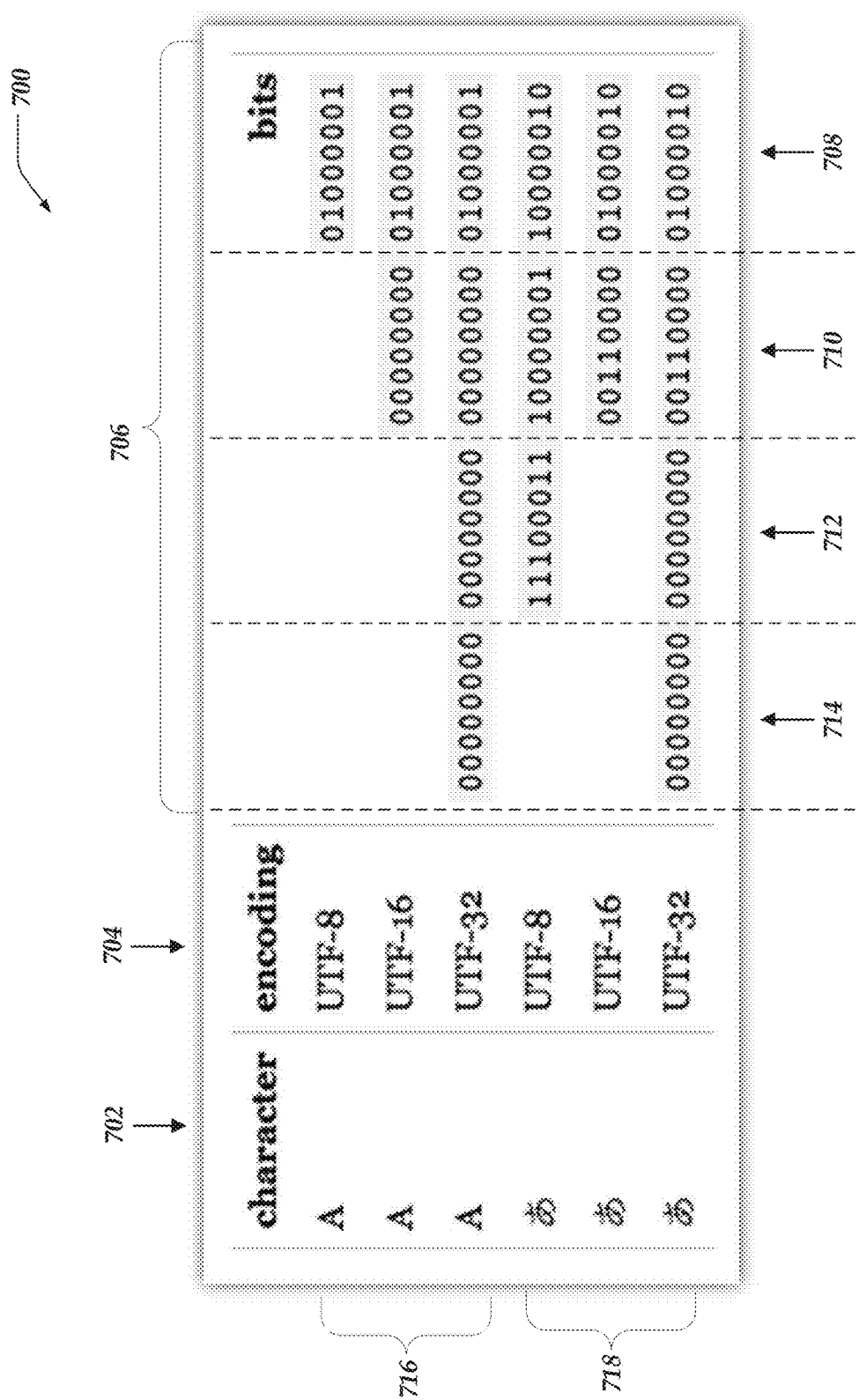
FIG. 7 illustrates a logical schematic of a table that compares character codes for encoding variable length characters using simultaneous processing in accordance with one or more of the various embodiments.

FIG. 7 illustrates a logical schematic of table 700 that compares character codes for encoding variable length characters using simultaneous processing in accordance with one or more of the various embodiments.

In one or more of the various embodiments, encoding engines may be arranged to encode/decode variable length characters using simultaneous processing for a variety of character codes that may support various character encoding schemes, including Unicode, ASCII, ECMA-6, EBCDIC, custom encoding schemes, or the like. In this example, for brevity and clarity, character codes UTF-8, UTF-16, and UTF-32 that encode Unicode characters are shown, but one of ordinary skill in the art will appreciate that encoding engines may be arranged to support other encoding schemes for encoding variable length characters using simultaneous processing.

In this example, table 700 includes: column 702 for storing characters; column 704 showing the character code type; column 706 that shows code units for the character; or the like. In this example, column 706 is further broken down into the individual byte sized units for different character codes. In this example, column 706 is divided to sub-columns that correspond to code units that may be used to represent the characters. In this example, UTF-8 is a character code that has 8-bit code units; thus each sub-column represents a code unit. Likewise, for example, UTF-16 is a character code that has 16-bit code units, thus 2-bytes may be required for each code unit. And, for example, UTF-32 is a character code has 32-bit code units, thus 4-bytes are required to represent characters using UTF-32.

In one or more of the various embodiments, some character codes may be arranged to employ a variable number of code units depending on the character being represented. For example, in table 700, character 716 may be represented by a single UTF-8, UTF-16, or UTF-32 code unit while character 718 may require one or more code units depending on the character code being used. In some embodiments, if the code point for a character can be represented in one code unit, one single code unit may be required. For example, character 716 may be considered to have a code point of 65 (decimal) or 0x01000001 in binary representation, thus it may be represented using one UTF-8, UTF-16, or UTF-32 code units because the code point for this character can fit 0x01000001 in one code unit. In contrast, in this example, character 718 may be considered a character that has code point value that is too large to store in an 8-bit code unit. Accordingly, as shown in this example, representing character 718 in UTF-8 requires more than one code unit but representing character 718 in UTF-16 or UTF-32 requires one code unit.

However, in some embodiments, as shown here, employing a character code to represent a given character in one character code may consume more memory than representing the same character in another character code. For example, representing character 716 using UTF-8 may require 8-bits while representing character 716 using UTF-16 or UTF-32 may require 16-bits or 32-bits respectively. Likewise, for example, representing character 718 using UTF-16 may require 16-bits while using UTF-8 or UTF-32 may require 24-bits or 32-bits respectively.

Further, in some embodiments, because 32-bit signatures included in code units may be used to sort UTF-8 code unit combinations when transforming to UTF-16 or UTF-32 targets to determine the codepoint group, and thus determine the number of tail bytes that should be associated with the code unit, conditional looping of sequential code unit processing as well as directional sorting for parallel processing may be selectively optimized. Sorting by itself may provide significant speed improvements as compared to than current sequential methods even in the absence of parallel processing. Combining the optimized sorting with parallel processing provides even further improvements in reducing processing time.

Generalized Operations

Figure 8:
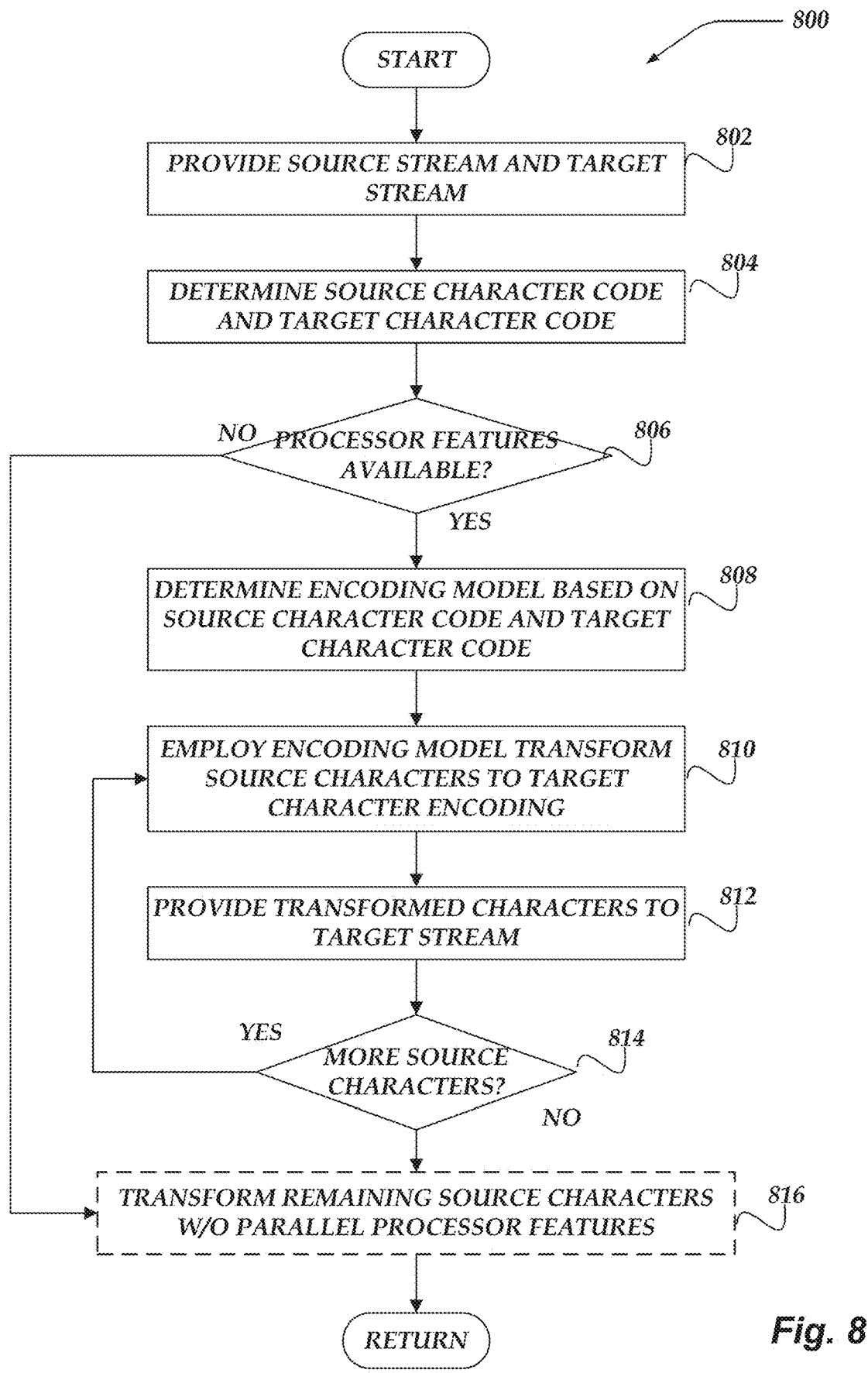
FIG. 8 illustrates an overview flowchart for a process for encoding variable length characters using simultaneous processing in accordance with one or more of the various embodiments.
Figure 9:
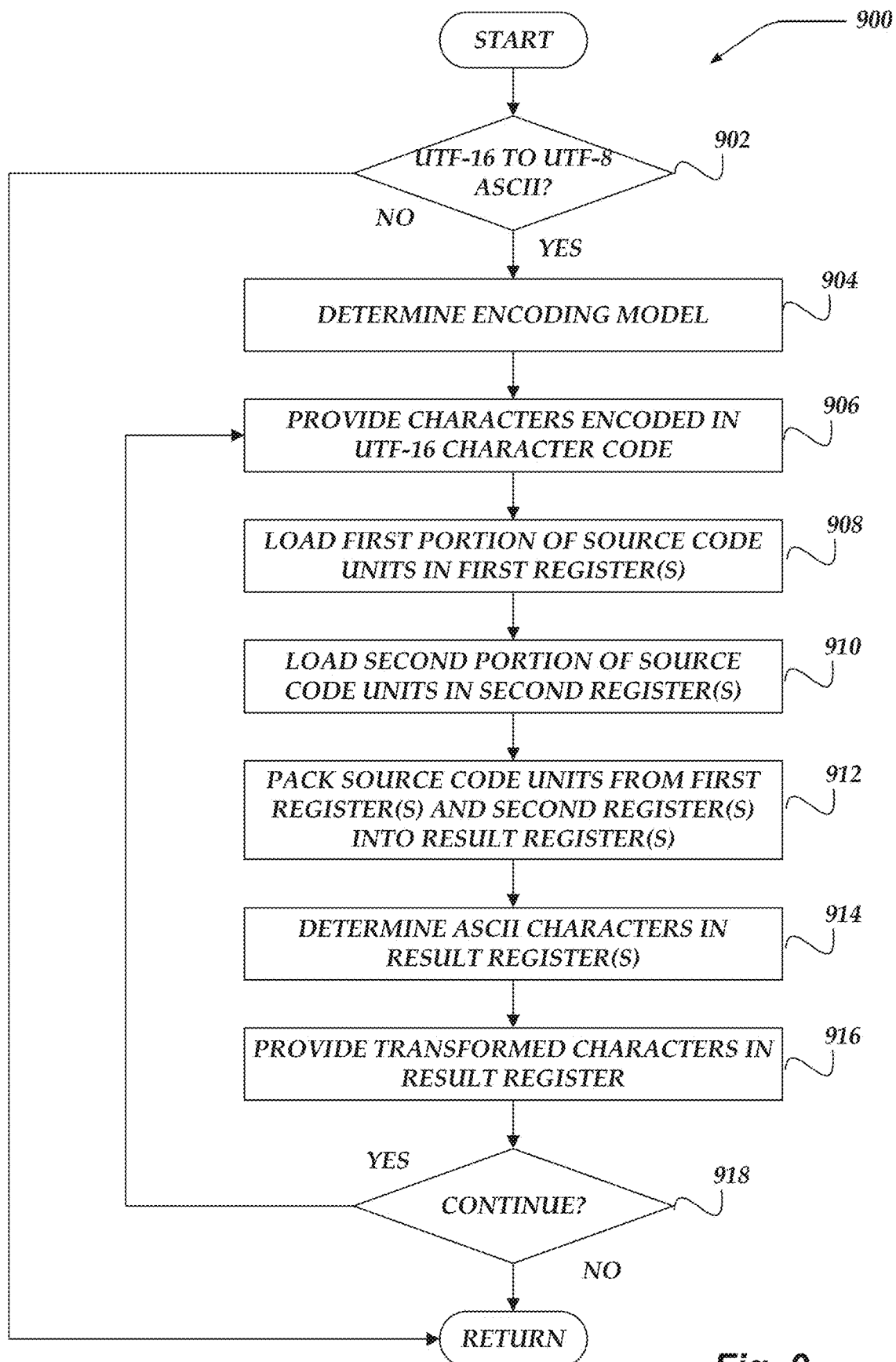
FIG. 9 illustrates a flowchart for a process for transforming UTF-16 encoded ASCII characters to UTF-8 in accordance with one or more of the various embodiments.
Figure 10:
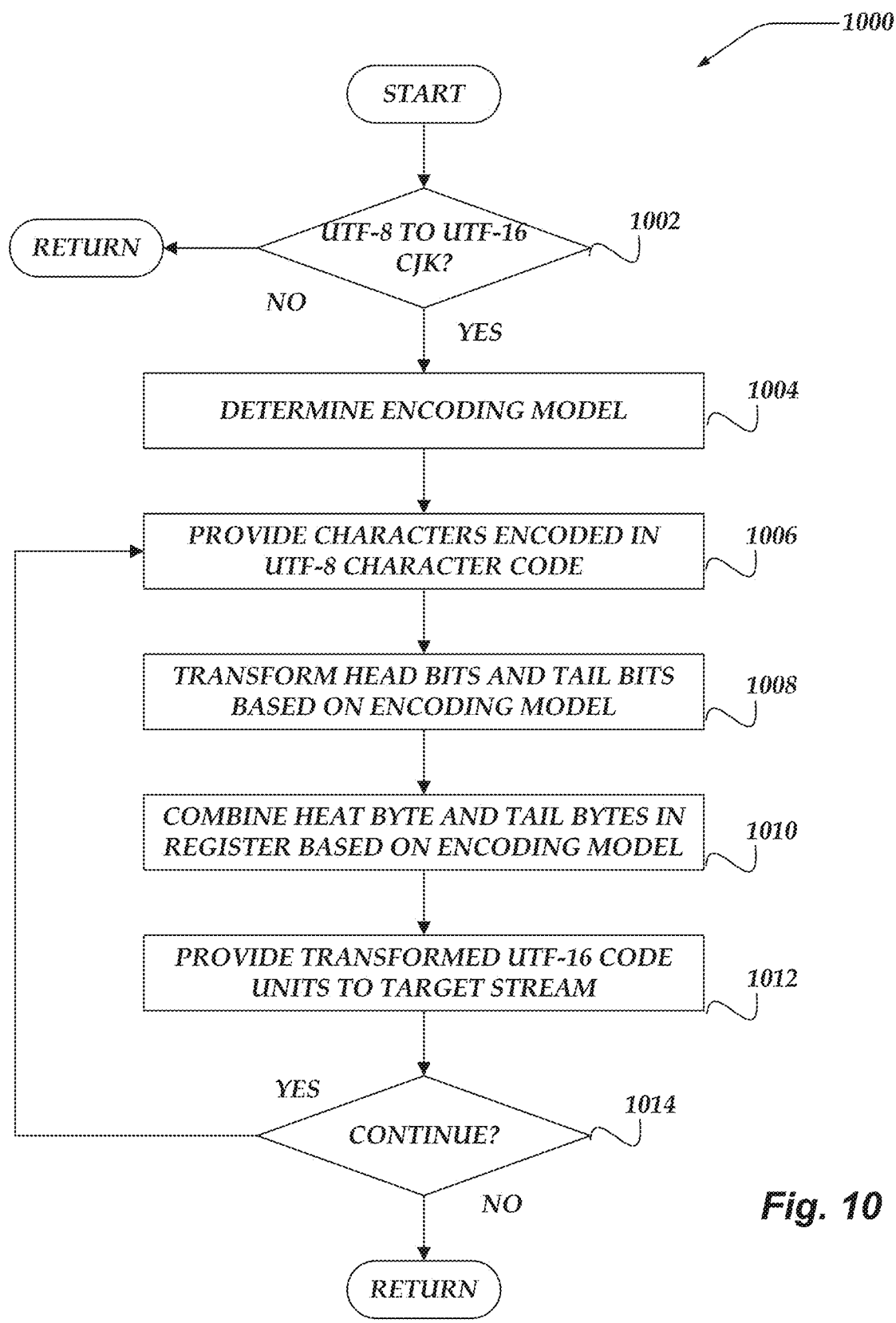
FIG. 10 illustrates a flowchart for a process for transforming UTF-8 encoded CJK characters to UTF-16 encoded CJK characters in accordance with one or more of the various embodiments.

FIGS. 8-10 represent generalized operations for encoding variable length characters using simultaneous processing in accordance with one or more of the various embodiments. In one or more of the various embodiments, processes 800, 900, and 1000 described in conjunction with FIGS. 8-10 may be implemented by or executed by one or more processors on a single network computer (or network monitoring computer), such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in a cloud-based environment. However, embodiments are not so limited and various combinations of network computers, client computers, or the like may be utilized. Further, in one or more of the various embodiments, the processes described in conjunction with FIGS. 8-10 may be used for encoding variable length characters using simultaneous processing in accordance with at least one of the various embodiments or architectures such as those described in conjunction with FIGS. 4-7. Further, in one or more of the various embodiments, some or all of the actions performed by processes 800, 900, and 1000 and may be executed in part by encoding engine 322, visualization engine 324, modeling engine 326, or the like.

FIG. 8 illustrates an overview flowchart for process 800 for encoding variable length characters using simultaneous processing in accordance with one or more of the various embodiments. After a start block, at block 802, in one or more of the various embodiments, a source stream and a target stream may be provided to one or more encoding engines.

In one or more of the various embodiments, source streams may be provided to encoding engines from a variety of sources. In some embodiments, source streams may be provided for files, databases, network endpoints, memory buffers, user input, or the like. In one or more of the various embodiments, one of ordinary skill in the art will appreciate that a source stream may be an input stream that an operating system, or the like, may provide to an encoding engine or more generally to a visualization platform. In many cases, the source stream may be arranged to provide an abstraction layer that separates the raw input source that provides the encoded source characters from other services, including encoding engines.

Similarly, in some embodiments, target streams may be output streams provided by operating systems, or the like, that provide an abstraction layer that separate the encoding engines from the services that may receive or consume the transformed characters, such as, files, databases, network endpoints, memory buffers, user interfaces/displays, or the like.

At block 804, in one or more of the various embodiments, encoding engines may be arranged to determine the source character code and the target character code. In some embodiments, the source stream or target stream may be associated with parameters, tags, metadata, or the like, that may indicate the source character code or the target character code. For example, in one or more of the various embodiments, if the source stream is a file, it may be associated with metadata that reports the character code that was used to encode its contents. Likewise, for example, if the target stream is a user interface display, the user interface may be associated with metadata that may indicate a preferred or supported character code. In some embodiments, encoding engines may be arranged to provide one or more APIs that enable calling services to explicitly declare source character codes or request target character codes.

At decision block 806, in one or more of the various embodiments, if processors executing the instructions for the encoding engines may include process features that enable parallel operations and the source stream includes sufficient code units, control may flow to block 808; otherwise, control may flow to block 816.

In one or more of the various embodiments, processor features for parallel processing of code units may be supported or provided by some processors (CPUs) and not others. Also, in some cases, CPUs that support parallel processing features may have those features disabled. Similarly, in some embodiments, both the CPU and operating system may be checked to determine if one or more required parallel processing features may be supported. For example, in some embodiments, if the CPU supports parallel processing features and the operating system does not support parallel processing features, parallel processing features may be unavailable. In some embodiments, if parallel processing features may be unavailable, encoding engines may be arranged to employ conventional processing features to transform characters.

In one or more of the various embodiments, CPUs may support one or more versions of parallel processing features. Accordingly, in one or more of the various embodiments, older CPUs may support fewer or different processor features than newer CPUs. Likewise, in some embodiments, CPUs from different manufacturers or CPUs having different architectures may support different processor features.

Accordingly, in some embodiments, encoding engines may be arranged to execute one or more tests to confirm the existence of sufficient processor features. In some embodiments, tests for determining the available processor features may be included in encoding models rather than in general purpose instructions of encoding engines.

Also, in some embodiments, as new CPUs, operating systems, or the like, may be provided, different processor features may become available. Accordingly, in some embodiments, encoding engines may be arranged to employ rules, instructions, conditions, tests, or the like, provided via configuration information to test for the existence or extent of processor features.

One of ordinary skill in the art will be aware of the particular system calls, feature flags, version IDs, or the like, that may correspond to one or more parallel processing features provided by CPUs or enabled by operating systems.

Further, in some embodiments, encoding engines may be arranged to test or otherwise determine if the number of code units in the source exceeds a minimum value. For example, even if there may be support for parallel processing, the source stream may not include sufficient code units to employ parallel code unit processing.

At block 808, in one or more of the various embodiments, encoding engines may be arranged to determine an encoding model based on the source character code and the target character code. As described above, encoding models may be arranged to support transforming one or more source character codes to one or more target character codes.

Further, as mentioned above, CPU/operating system support for parallel processing features may vary depending on manufacturer, model, version, or the like. Thus, in some embodiments, two or more encoding models that may support the same character code transformations may support different processor features. For example, a first encoding model and a second encoding model may support the same transformation, however, the first encoding model may be limited to supporting less performant processor features while the second encoding model may support newer more performant processor features. Accordingly, in one or more of the various embodiments, encoding engines may be arranged to selectively determine one or more encoding models from among the encoding models that may support the requested transformation. Accordingly, in some embodiments, encoding models may be ranked, or the like. In some embodiments, encoding engines may be arranged to employ encoding models selected from among one or more qualifying encoding models based on rules, instructions, conditions, or the like, provided via configuration information to account for local circumstances or local requirements.

At block 810, in one or more of the various embodiments, encoding engines may be arranged to employ the determined encoding model to transform the source characters into characters encoded using the target character code.

As described above, encoding models may be comprised of data structures, libraries, or the like, that include the specific instructions, rules, conditions, or the like, for transforming characters from one character code to another character code.

Accordingly, in some embodiments, encoding engines may be arranged to employ the selected encoding models to transform the source characters for the source character code into characters encoded using the target character code.

In one or more of the various embodiments, encoding models may be arranged to provide instructions that leverage parallel processing features to enable one or more transformations to occur in parallel to reduce branching, looping, or the like. In some embodiments, encoding models for encoding variable length characters using simultaneous/parallel processing may include loading multiple code units into registers and then employing one or more register operations, such as, masking, shifting, or the like, that operate directly on registers enabling more code units to be processed at the same time. For example, if registers are 16-bytes wide, sixteen UTF-8 code units may be read into a single register for processing. In contrast, sequential processing of code units may require processing each code unit individually using looping, deterministic finite automaton, or the like. Note, in some embodiments, the instructions or operations defined by a particular encoding model may depend on the source character code and target character code involved in the transformation as well as the availability of processor features. In some embodiments, one or more transformations may be ineligible for parallel processing optimizations depending on the availability of processor features.

At block 812, in one or more of the various embodiments, encoding engines may be arranged to provide the characters encoded in the target character code to the target stream. In one or more of the various embodiments, if the encoding engine completes the transformation operation for a set of characters, encoding engines may be arranged to move the transformed code units into conventional registers or memory associated with the target stream. Accordingly, in some embodiments, other services may employ the transformed characters (e.g., user interfaces, displays, files, databases, or the like) and may receive the characters encoded in the target character code.

At decision block 814, in one or more of the various embodiments, if the source stream has more characters available and the number of code units is sufficient to use parallel transformation, control may loop back to block 810; otherwise, control may flow to block 816.

In one or more of the various embodiments, encoding engines may be arranged to process chunks of encoded characters from the source stream. In some embodiments, the number of encoded characters in each chunk may vary depending on one or more of the selected encoding models, source/target character codes, or the available processor features. For example, in some embodiments, if a CPU has processor features that enable 512-bit wide registers, it may process 64 UTF-8 code units at a time or 16 UTF-32 code units at a time. In contrast, for example, a CPU that has processor features that provide 128-bit wide registers may process 16 UTF-8 code units or 4 UTF-32 code units at a time.

At block 816, in one or more of the various embodiments, optionally, encoding engines may be arranged transform the one or more remaining source characters absent parallel processing features. Accordingly, in some embodiments, if parallel processing features may be unavailable or the number of source code units is too small for parallel processing transformations may be performed sequentially per code unit using conventional processor features.

Note, this block is indicated as being optional because in some cases for some embodiments, all source characters may have been processed using parallel processing features.

Next, in one or more of the various embodiments, control may be returned to a calling process.

FIG. 9 illustrates a flowchart for process 900 for employing an encoding model to transform UTF-16 encoded ASCII characters to UTF-8 in accordance with one or more of the various embodiments.

After a start block, at decision block 902, in one or more of the various embodiments, if encoding engines may be employed to transform ASCII characters encoded in UTF-16 into UTF-8, control may flow to block 904; otherwise, control may be returned to a calling process.

As described above, in some embodiments, encoding engines may receive requests, or the like, to transform encoded characters from one or more character codes to one or more other character codes.

In this example, the encoding engine may be considered to receive a request to transform UTF-16 encoded characters that may be or are assumed to be ASCII characters meaning that they may correspond to Unicode code points 0-127. Unicode code points 0-127 map to ASCII code points to support compatibility with the popular ASCII character encoding.

In one or more of the various embodiments, transforming ASCII characters encoded as UTF-16 characters may be advantageous because the minimum code unit for UTF-16 is 16-bits (2 bytes). Thus, in this example, 16-bits (two bytes) are required to represent characters that could be represented using 8-bits (one byte). Note, in this example, if non-ASCII code points, such as, Unicode code points having values greater than 127 are transformed from UTF-16 to UTF-8, more than one UTF-8 code unit will be required, or the character may be considered unprintable.

In one or more of the various embodiments, if the source characters are not ASCII, encoding engine may exit process 900 so the source characters may be evaluated to determine if different transformations may be applied.

At block 904, in one or more of the various embodiments, encoding engines may be arranged to determine an encoding model that may be employed to perform the requested transformation.

In one or more of the various embodiments, encoding engines may be arranged to select an encoding model based on the source character code and target character code as well as other factors, such as, requesting that the target characters are ASCII compatible. In this example, for some embodiments, the source character code is UTF-16 and the target character code is UTF-8 with the additional requirement or expectation that the source characters are transformed into a single UTF-8 code unit. Thus, in this example, source characters that cannot be represented using ASCII compatible code points may be treated as unprintable characters rather than using additional code units to represent them.

For example, if a user knows that a file stored using UTF-16 encoding includes only or mostly ASCII compatible characters, the user may request that the characters in the file be transformed to UTF-8 to reduce the amount of memory/space used to represent the characters in the file.

Further, as described above, in some embodiments, the encoding model may be selected based on the available parallel processing features provided by the CPUs/operating system being used.

At block 906, in one or more of the various embodiments, encoding engines may be provided one or more source characters encoded in UTF-16. In one or more of the various embodiments, a source stream that provide characters encoded using UTF-16 may be provided. Similarly, in some embodiments, a target stream that may be suitable for storing UTF-8 characters may be provided.

At block 908, in one or more of the various embodiments, encoding engines may be arranged to load a first portion of code units that correspond to the one or more source characters into a first register or other memory location (referred herein as registers).

In one or more of the various embodiments, encoding engines may be arranged to load a number of UTF-16 characters that may fit into a register. For example, for some embodiments, if the processor features enable register width of 128-bits (16 bytes), eight 2-byte wide UTF-16 code units may be loaded in a first register.

For example, an encoding model arranged to support Intel processors may include one or more instructions similar to:

_m128i codeunitLoadedfirst=_mm_Loadu_si128
((_m128i const*)source);

At block 910, in one or more of the various embodiments, encoding engines may be arranged to load a second portion of code units that correspond to the one or more source characters into a second register. Here, block 910 may be considered similar to block 908, except the next set of UTF-16 characters may be loaded from the source stream into another register.

For example, an encoding model arranged to support Intel processors may include one or more instructions similar to:

_m128i codeunitLoadedfirst=_mm_Loadu_si128
((_m128i const*)source+8));

Accordingly, in this example, the encoding model is arranged to read 16 UTF-16 characters, eight into the first register and eight into the second register.

At block 912, in one or more of the various embodiments, encoding engines may be arranged to pack the source character code units into a result wide register.

In some embodiments, encoding engines may be arranged to execute register instructions to pack the 2-byte UTF-16 code units that are stored in the first register and the second register into a single result register. In this example, packing the two registers may comprise treating each 2-bytes in the first and second wide registers as 16-bit integers that may be packed into 8-bits that are stored in the wide result register. In this example, the eight UTF-16 code units in the first register and the eight UTF-16 code units in the second register are treated as 16-bit integers that are packed into the result register as 8-bit integers. In this example, the register packing feature may employ saturated packing that sets a packed value to the maximum value of the data type if the value held in the 16-bit integer cannot be represented by an 8-bit integer. For example, a 16-bit UTF-16 code unit such as 0 x0041 may be packed into an 8-bit integer with a value of 0x41. And, for example, a 16-bit UTF-16 code unit with a value of 0x0A41 may be packed into 8-bit integer with a value of 0xFF because the 16-bit value 0x0A41 cannot fit in an 8-bit integer.

Notably, UTF-16 characters that represent ASCII compatible characters will have a value of 0-127 (0x0001-0x007F) enabling them to be packed into 8-bit integers without issue.

For example, an encoding model arranged to support Intel processors may include one or more instructions similar to:

```
_m128i simdUtf8Ascii=_mm_packus_epi16(codeunit-
    sLoadedfirst,codeunitsLoadedSecond);
```

At block 914, in one or more of the various embodiments, encoding engines may be arranged to determine the number ASCII characters that may be in the result register.

In this example, if the result register was generated from UTF-16 characters that have ASCII compatible code points, the result register will now be storing 16 UTF-8 code units that each correspond to ASCII characters. In contrast, for some reason, the source stream provided UTF-16 code units that included non-ASCII characters, one or more integers in the result register will have the value of 0xFF which is not an ASCII code point.

In this example, counting the number of 8-bit integers in the result register that are between 0x00 and 0x7F will determine the number of ASCII characters that were transformed. And, in this example, counting the number of 8-bit integers in the result register that have a value of 0xFF will indicate UTF-16 characters from the source stream that do not resolve to ASCII characters.

In some embodiments, parallel processing features may support a single operation that generates a mask from registers based on the value (0 or 1) of each most significant bit in the 8-bit integer held in the register. Accordingly, in one or more of the various embodiments, if the result register is holding ASCII characters, the MSB for those corresponding 8-bit integers will be set to 0. As a final step, the mask produced from the result register may itself be OR'd with 0xFFFF0000 such that the resultant mask will be a 32-bit integer.

Then the number of ASCII characters may be determined based the position of the least-significant-bit in the mask.

For example, an encoding model arranged to support Intel processors may include one or more instructions similar to:

```
int32_t maskHighBits = _mm_movemask_epi8(simdUtf8Ascii) | 0xFFFF0000;
int asciiCount = LSBSet(maskHighBits);
```

At block 916, in one or more of the various embodiments, encoding engines may be arranged to provide the transformed characters in the result to the target stream.

Accordingly, in some embodiments, the 8-bit UTF-8 code points in the result register may be passed to calling process as regular (e.g., non-wide register) memory.

For example, an encoding model arranged to support Intel processors may include an instruction similar to:

```
_mm_storeu_si128(reinterpre_cast<_m128i*>(desti-
    nation),simdUtf8Ascii);
```

At decision block 918, in one or more of the various embodiments, if processing should continue, control may loop back to block 906; otherwise, control may be returned to a calling process.

In one or more of the various embodiments, there needs to be sufficient remaining length for both source and target for continuing with parallel processing. Otherwise, the parallel structures may reference memory out of bounds, potentially causing an exception fault. Also, in some embodiments, if the first codepoint is not ASCII the process should exit to avoid the potential for an infinite loop.

For example, an encoding model arranged to support Intel processors may include one or more instructions similar to:

```
destination += asciiCount;
source += asciiCount;
return asciiCount;
```

FIG. 10 illustrates a flowchart for process 1000 for employing an encoding model to transform UTF-8 encoded CJK characters to UTF-16 encoded CJK characters in accordance with one or more of the various embodiments. After a start block, at decision block 1002, in one or more of the various embodiments, if encoding engines may be employed to transform Unicode CJK characters encoded using UTF-8 to UTF-16 characters, control may flow to block 1004; otherwise, control may be returned to a calling process.

Similar as described above for process 900, or the like, source character code or target character code may be determined.

At block 1004, in one or more of the various embodiments, encoding engines may be arranged to determine an encoding model that may be employed to perform the requested transformation. Similar to as described above, encoding engines may be arranged to select an encoding model that may be suitable for transforming the source character code into the target character code.

At block 1006, in one or more of the various embodiments, encoding engines may be provided one or more source characters encoded in UTF-8.

In some embodiments, if the parallel processing features associated with the CPU support 128-bits wide registers, 16 UTF-8 code units may be read into a register.

Further, in some embodiments, the encoding model may include instructions for generating one or more masks suitable for transforming UTF-8 into UTF-16. In this example, the encoding model is designed to transform CJK characters that are represented using UTF-8. Thus, three UTF-8 code unit will be required for each CJK character. Note, Unicode defines algorithms for converting between UTF-8, UTF-16, or UTF-32. One of ordinary skill in the art will be aware that these may be described in Unicode documentation, including at least RFC-3629, RFC-2781, or the like. However, innovations described herein that employ parallel processing features are not disclosed by the Unicode standard or related RFCs.

For example, an encoding model arranged to support Intel processors may include one or more instructions similar to:

```
__m128i codeunitsLoaded = _mm_loadu_si128((__m128i const*) source);
__m128i cjkMaskOr = _mm_or_si128(codeunitsLoaded, cjkBitMask);
__m128i cjkCmp = _mm_cmpeq_epi8(cjkMaskOr, cjkCmpMask);
```

At block 1008, in one or more of the various embodiments, encoding engines may be arranged to transform head bytes and tail bytes of the source characters.

For example, an encoding model arranged to support Intel processors may include one or more instructions similar to:

```
// The comparison of the mask sets the high bits to successful matches.
// Flipping the bits is
// appropriate for calling LSBSet( ), and has the side effect of setting
// all bits higher than 16, so conditional not needed.
//
int32_t maskHighBits = _mm_movemask_epi8(cjkCmp);
int cjkCodePoints = LSBSet(~maskHighBits) / 3;
//Mask off high bits, i.e. leave only bits used in conversion
//
codeunitsLoaded = _mm_and_si128(codeunitsLoaded, cjkBitMask);
//Load for tailbytes in utf-16
//
__m128i cjkTail2 = _mm_shuffle_epi8(codeunitsLoaded, cjkShuffleTail2);
__m128i cjkTail1 = _mm_shuffle_epi8(codeunitsLoaded, cjkShuffleTail1);
cjkTail1 = _mm_sll_epi16(cjkTail1, codeunit6Shiftutf16);
cjkTail1 = _mm_or_si128(cjkTail1, cjkTail2);
// Modify for headbyte in utf-16
//
codeunitsLoaded = _mm_shuffle_epi8(codeunitsLoaded, cjkShuffleHead);
codeunitsLoaded = _mm_sll_epi16(codeunitsLoaded, codeunit12Shiftutf16);
```

At block 1010, in one or more of the various embodiments, encoding engines may be arranged to combine head bytes and tail bytes in a register.

For example, an encoding model arranged to support Intel processors may include one or more instructions similar to:

```
// Combine the headbyte & tailbytes
//
codeunitsLoaded = _mm_or_si128(codeunitsLoaded, cjkTail1);
```

At block 1012, in one or more of the various embodiments, encoding engines may be arranged to provide the transformed UTF-16 code units to the target stream.

For example, an encoding model arranged to support Intel processors may include one or more instructions similar to:

```
// Put into destination (target stream)
//
_mm_storeu_si128(reinterpret_cast<__m128i*> (destination), codeunitsLoaded);
```

At decision block 1014, in one or more of the various embodiments, if processing may continue, control may loop back to block 1006; otherwise, control may be returned to a calling process.

Also, in one or more of the various embodiments, there needs to be sufficient remaining length for both source and target for continuing with parallel processing. Otherwise, the parallel structures may reference memory out of bounds, potentially causing an exception fault. Also, in some embodiments, if the first codepoint is not CJK the process should exit to avoid the potential for an infinite loop.

For example, an encoding model arranged to support Intel processors may include one or more instructions similar to:

```
        // Increment source and destination
        //
        source += cjkCodePoints * 3;
        destination += cjkCodePoints;
        return cjkCodePoints;
```

It will be understood that each block in each flowchart illustration, and combinations of blocks in each flowchart illustration, can be implemented by computer program instructions. These program instructions may be provided to a processor to produce a machine, such that the instructions, which execute on the processor, create means for implementing the actions specified in each flowchart block or blocks. The computer program instructions may be executed by a processor to cause a series of operational steps to be performed by the processor to produce a computer-implemented process such that the instructions, which execute on the processor, provide steps for implementing the actions specified in each flowchart block or blocks. The computer program instructions may also cause at least some of the operational steps shown in the blocks of each flowchart to be performed in parallel. Moreover, some of the steps may also be performed across more than one processor, such as might arise in a multi-processor computer system. In addition, one or more blocks or combinations of blocks in each flowchart illustration may also be performed concurrently with other blocks or combinations of blocks, or even in a different sequence than illustrated without departing from the scope or spirit of the invention.

Accordingly, each block in each flowchart illustration supports combinations of means for performing the specified actions, combinations of steps for performing the specified actions and program instruction means for performing the specified actions. It will also be understood that each block in each flowchart illustration, and combinations of blocks in each flowchart illustration, can be implemented by special purpose hardware-based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

Illustrative Use Cases

FIGS. 11-27 represent use cases described in terms of a particular character encoding (Unicode) using various processor features that may be available in some processors provided by particular manufacturers. Note, one of ordinary skill in the art will appreciate the innovations disclosed herein anticipate other character encoding standard or other processor features. Accordingly, for brevity and clarity additional use cases or examples for other character encoding standards or processors are omitted.

FIG. 11 illustrates a summary of a portion of a character encoding standard that may be in accordance with one or more of the various embodiments. In this example, the character encoding standard of interest is Unicode. This table provides information about the Unicode character encoding standard to provide context for the Unicode related examples included above and below. However, it is assumed that one of ordinary skill in the art will be familiar with character encoding standards in general and also familiar with Unicode in particular.

In this example, table 1102 represents an informal categorization of different portions of Unicode character map or character code book. In some cases, character encoding standards may order characters in the code book based on various characteristics. Character encoding standards may be arranged to categorize character encoding such that the encoding may be advantageous given various considerations that may of importance to the designer of the character encoding standard.

In this example, column 1104 represents a nickname of informal label of the category. Note, in this example, column 1104 is described as including nicknames because the categories or their labels may not be formally included in Unicode. In other cases, such as, other character encoding standards, one or more categories in accordance with one or more of the various embodiments may be formally declared. Thus, in some cases, column 1104 would represent formal category labels.

In this example, column 1106 represents the range of code points that map to a character included in a given category. Also, in this example, code points are represented using hexadecimal values.

In this example, row 1106 declares the nickname of Ascii to code points that fall in the range of 0x0000-0x007F. In Unicode characters that are supported by ASCII character encoding are in this category. Row 1108, declares the Greek category representing another range of characters (0x0080-0x07FF). Row 1110, declares the CJK (Chinese language characters, Japanese language characters, and Korean language characters) category representing a range of code points that represent many Asian language characters. Further, in this example, row 1110 declare the Emoji category representing another range of characters (0x0001000-0x0010FFFF) most of which are commonly referred to as emojis.

Note, there may be exceptions or omissions with respect to these informal categories but one of ordinary skill in the art will appreciate that these informal categories provide a useful short hand method of group characters into categories with similar characteristics.

In this example, table 1114 illustrates some of the advantages, restrictions, or the like, associated with transforming from one Unicode character code to another Unicode character code. Column 1116 represents the source character code, column 1118 represents if character code UTF-8 is the target, column 1120 represents if character code UTF-16 is the target, and column 1122 represents if character code UTF-32 is the target. Accordingly, row 1124 represents a source character code of UTF-8, row 1126 represents a source character code of UTF-16, row 1128 represents a source character code of UTF-32.

FIGS. 12-27 represent generalized operations for encoding variable length characters using simultaneous processing in accordance with one or more of the various embodiments. In particular FIG. 12-27 may represent actions or operations that may be included in one or more encoding models that may be employed for encoding variable length characters using simultaneous processing. Accordingly, in one or more of the various embodiments, processes 1200, 1300, 1400, 1500, 1660, 1700, 1800, 1900, 2000, 2100, 2200, 2300, 2400, 2500, 2600, and 2700 described in conjunction with FIGS. 12-27 may be implemented by or executed by one or more processors on a single network computer (or network monitoring computer), such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in a cloud-based environment. However, embodiments are not so limited and various combinations of network computers, client computers, or the like may be utilized. Further, in one or more of the various embodiments, the processes described in conjunction with FIGS. 12-27 may be used for encoding variable length characters using simultaneous processing in accordance with at least one of the various embodiments or architectures such as those described in conjunction with FIGS. 4-7. Further, in one or more of the various embodiments, some or all of the actions performed by processes 1200, 1300, 1400, 1500, 1660, 1700, 1800, 1900, 2000, 2100, 2200, 2300, 2400, 2500, 2600, and 2700 and may be executed in part by encoding engine 322, visualization engine 324, modeling engine 326, or the like.

Figure 12:
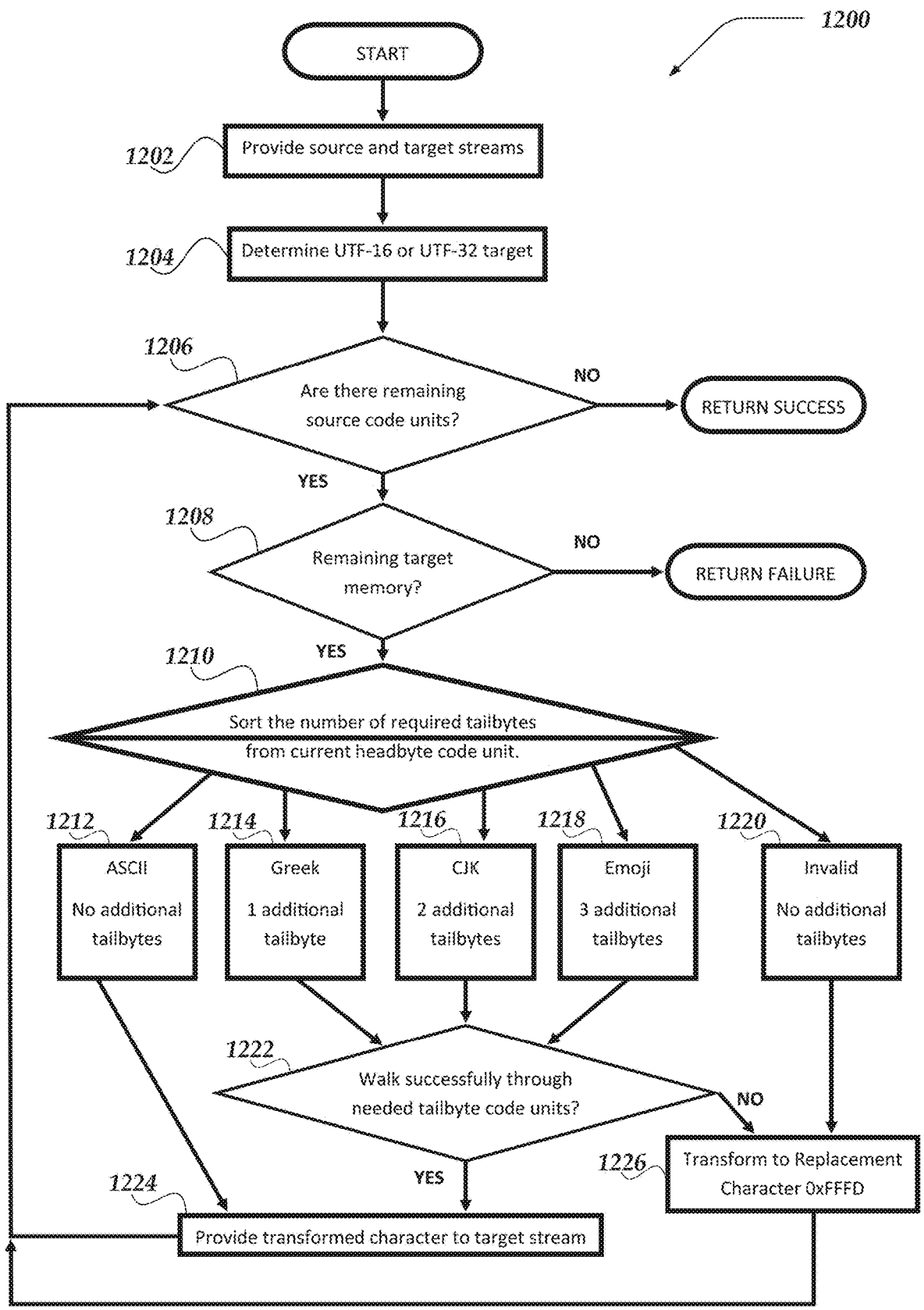
FIG. 12 illustrates a flowchart for a process for sequential single code unit UTF-8 source to target (any) in accordance with one or more of the various embodiments.

FIG. 12 illustrates a flowchart for process 1200 for sequential single code unit UTF-8 source to target (any) in accordance with one or more of the various embodiments. After a start block, at block 1202, in one or more of the various embodiments, provide source and target streams. At block 1204, determine UTF-16 or UTF-32 target. At decision block 1206, if there remaining source code units, control may flow to decision block 1208; otherwise control may be returned to a calling process. At decision block 1208, if there may be remaining target memory, control may flow to decision block 1208; otherwise control may be returned to a calling process. At sorting block 1210, in one or more of the various embodiments, sort the number of required tailbytes from current headbyte code unit. Actions below may be selected based on the category of the character(s) or code units being processed. At block 1212, if category is ASCII there are no additional tailbytes, control may flow to block 1224. At category block 1214, if the category is Greek there may one more additional tailbyte, therefore control may flow to decision block 1222. At category block 1216, if the category is CJK there may two more additional tailbytes, therefore control may flow to decision block 1222. At category block 1218, if the category is Emoji there may three additional tailbyte, therefore control may flow to decision block 1222. At category block 1220, if the character is invalid; control may flow to block 1226. At decision block 1222, if the encoding engine may Walk successfully through needed tailbyte code units, control may flow to block 1224; otherwise control may flow to block 1226. At block 1224 the encoding engine may provide the transformed character to target stream. At block 1226 the encoding engine may transform the character to Replacement Character 0xFFFD representing an invalid character or failed transformation.

Figure 13:
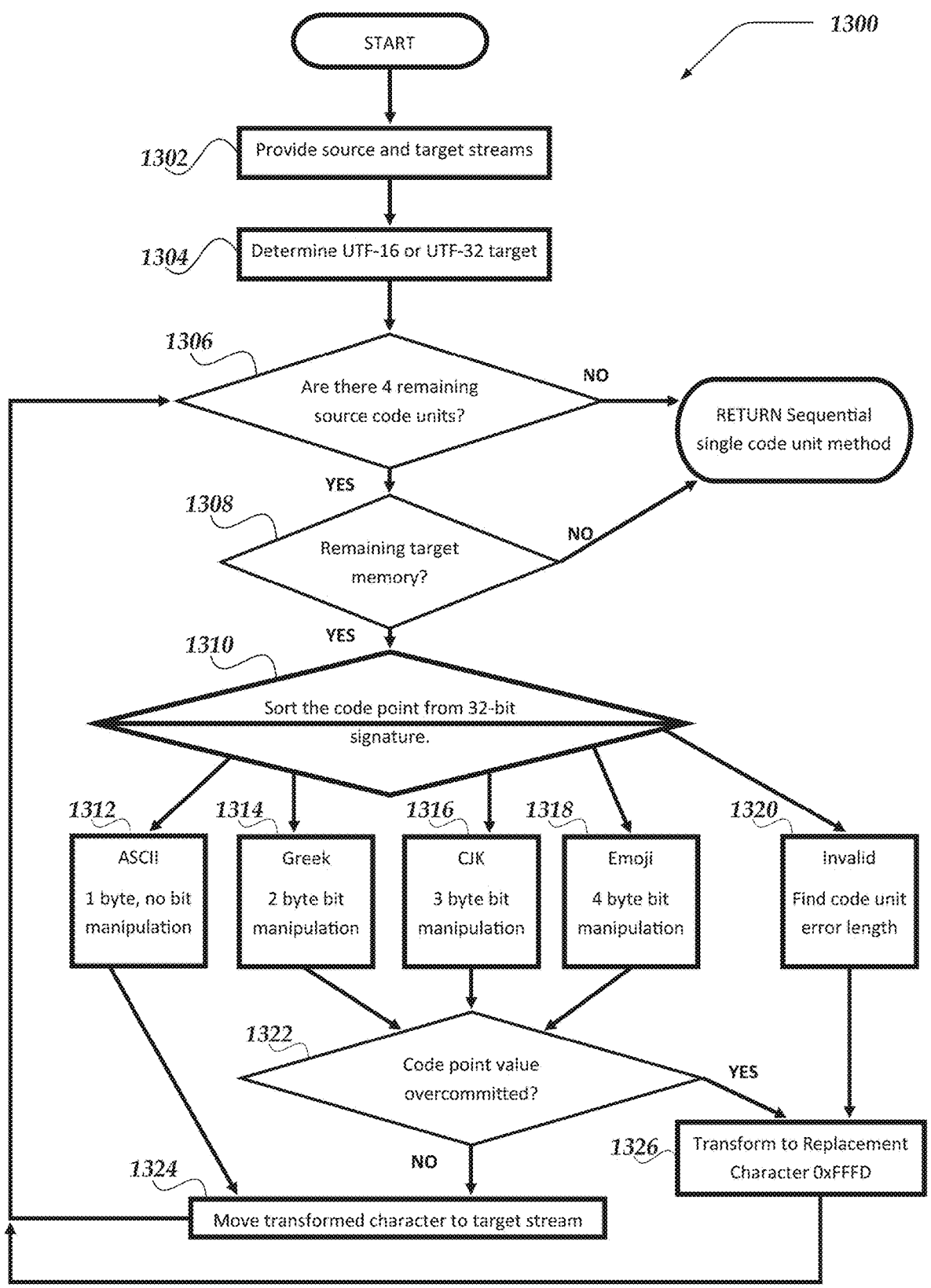
FIG. 13 illustrates a flowchart for a process for signature 32-bit UTF-8 source to target (any) in accordance with one or more of the various embodiments.

FIG. 13 illustrates a flowchart for process 1300 for signature 32-bit UTF-8 source to target (any) in accordance with one or more of the various embodiments. After a start block, at block 1302 provide source and target streams. At block 1304, determine UTF-16 or UTF-32 target. At decision block 1306, if there are there 4 remaining source code units, control may flow to block decision block 1308; otherwise control may be returned to another process. At decision block 1308, if there may be remaining target memory, control may flow to sorting block 1310; otherwise control may be returned to another process. At sorting block 131, sort the code point from 32-bit signature. At category block 1312, if the category is ASCII (1 byte), no bit manipulation; control may flow to block 1324. At category block 1314, if the category is Greek 2 byte bit manipulation; control may flow to decision block 1322. At category block 1316, if the category is CJK 3 byte bit manipulation; control may flow to decision block 1322. At category block 1318, if the category is Emoji 4 byte bit manipulation; control may flow to decision block 1322. At block 1320, if the character is invalid, find code unit error length; control may flow to block 1326. At block 1322, if the code point value may be overcommitted, control may flow to block 1326; control may flow to block 1324. At block 1324, the transformed character may be moved to target stream. At block 1326 Transform the character to Replacement Character 0xFFFD.

Figure 14:
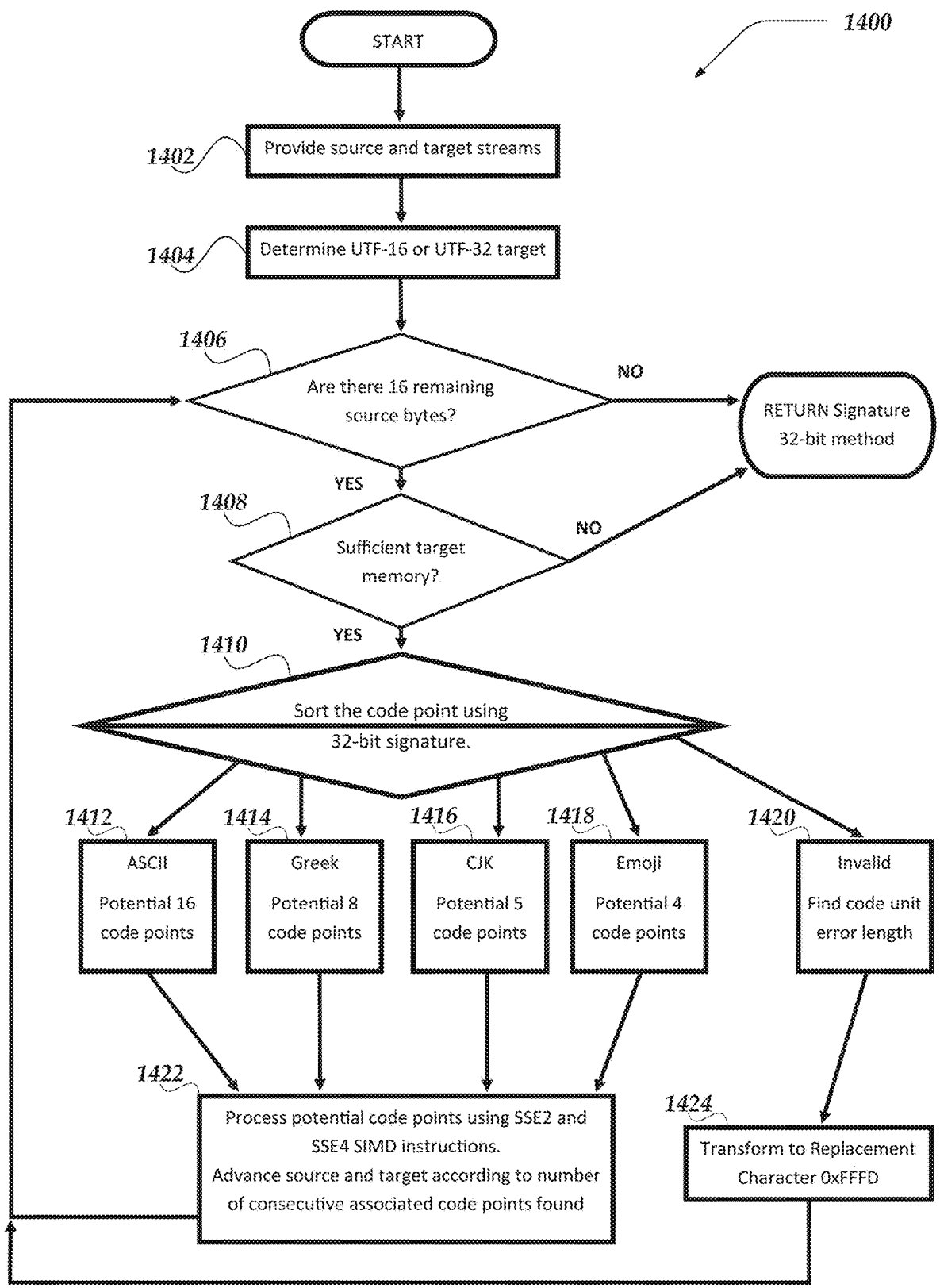
FIG. 14 illustrates a flowchart for a process for SSE4 128-bit UTF-8 source to target (any) in accordance with one or more of the various embodiments.

FIG. 14 illustrates a flowchart for process 1400 for SSE4 128-bit UTF-8 source to target (any) in accordance with one or more of the various embodiments. At block 1402 Provide source and target streams. At block 1404 Determine UTF-16 or UTF-32 target. At block 1406 Are there 16 remaining source bytes? At block 1408 Sufficient target memory? At block 1410 Sort the code point using 32-bit signature. At block 1412 ASCII Potential 16 code points. At block 1414 Greek Potential 8 code points. At block 1416 CJK Potential 5 code points. At block 1418 Emoji Potential 4 code points At block 1420 Invalid Find code unit error length. At block 1422 Process potential code points using SSE2 and SSE4 SIMD instructions. Advance source and target according to number of consecutive associated code points found. At block 1424 Transform to Replacement Character 0xFFFD.

Figure 15:
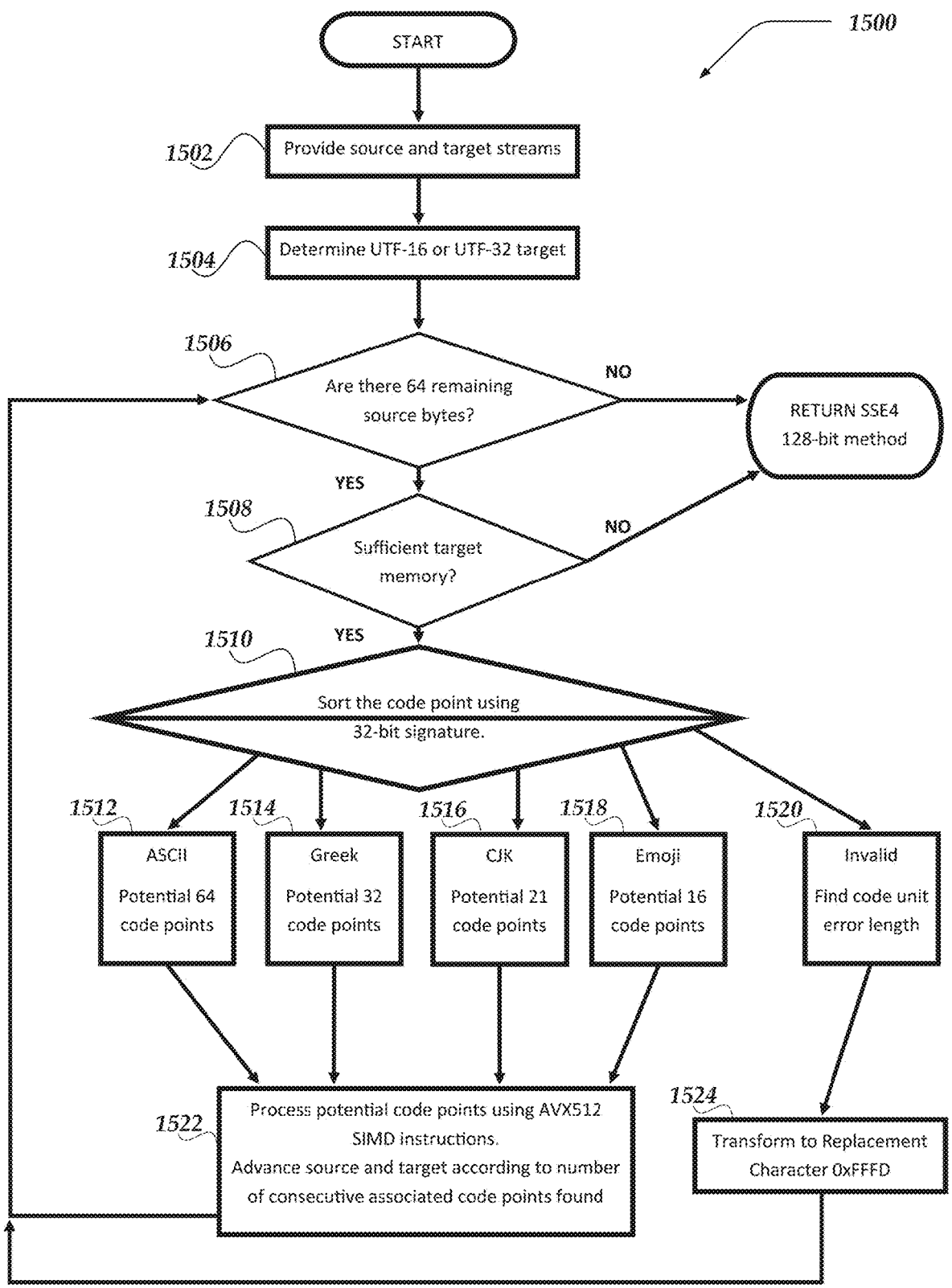
FIG. 15 illustrates a flowchart for a process for AVX-512 512-bit UTF-8 source to target (any) in accordance with one or more of the various embodiments.

FIG. 15 illustrates a flowchart for process 1500 for AVX 512-bit UTF-8 source to target (any) in accordance with one or more of the various embodiments. At block 1502 Provide source and target streams. At block 1504 Determine UTF-16 or UTF-32 target. At block 1506 Are there 64 remaining source bytes? At block 1508 Sufficient target memory?. At block 1510 Sort the code point using 32-bit signature. At block 1512 ASCII Potential 64 code points. At block 1514 Greek Potential 32 code points. At block 1516 CJK Potential 21 code points. At block 1518 Emoji Potential 16 code points. At block 1520 Invalid Find code unit error length. At block 1522 Process potential code points using AVX512 SIMD instructions. Advance source and target according to number of consecutive associated code points found. At block 1524 Transform to Replacement Character 0xFFFD.

Figure 16:
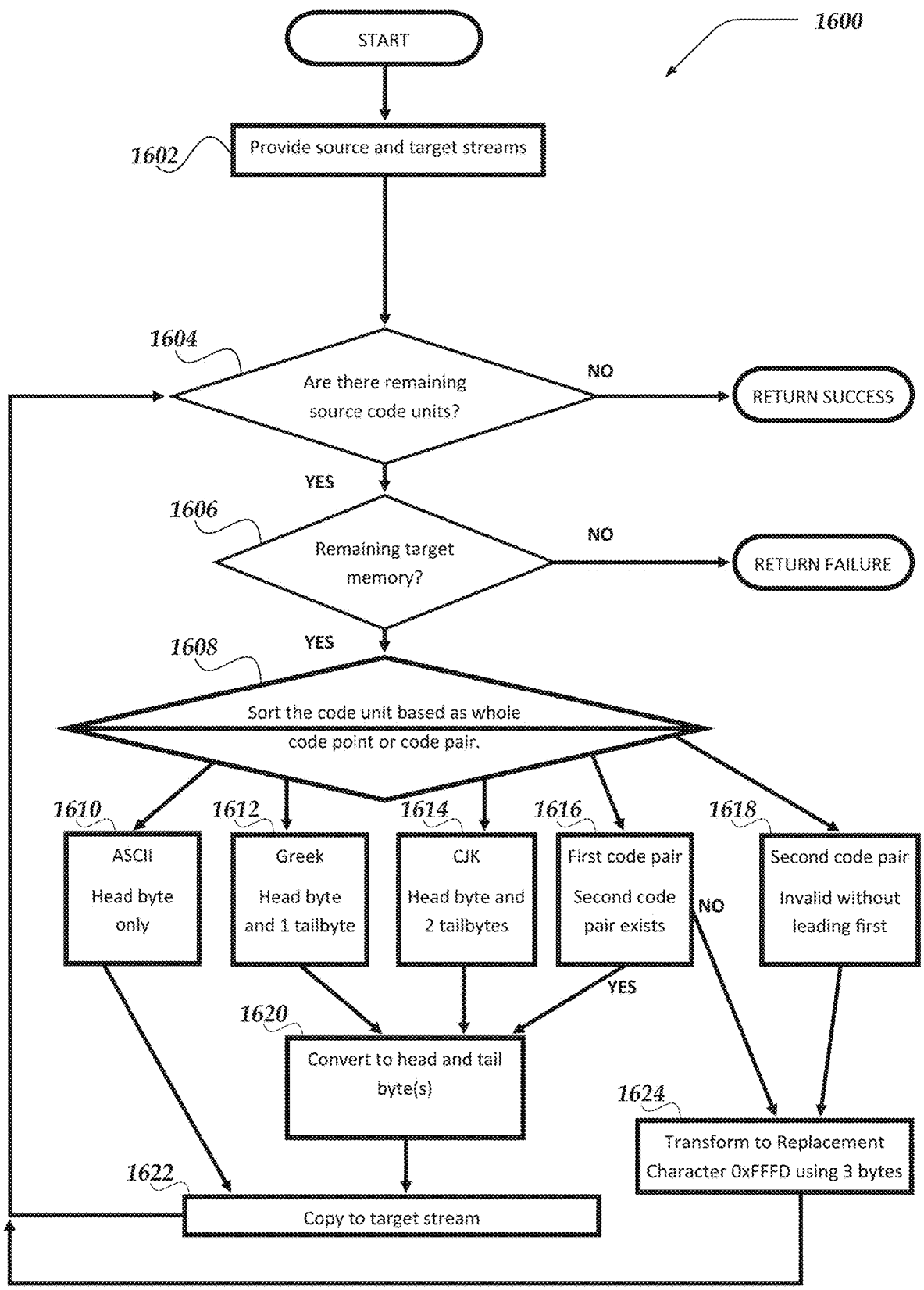
FIG. 16 illustrates a flowchart for a process for Sequential single code unit (current) UTF-16 source to UTF-8 target.

FIG. 16 illustrates a flowchart for process 1600 for Sequential single code unit (current) UTF-16 source to UTF-8 target. At block 1602 provide source and target streams. At block 1604, are there remaining source code units? At block 1606, remaining target memory? At block 1608 sort the code unit based as whole code point or code pair. At block 1610 ASCII Head byte only. At block 1612 Greek Head byte and 1 tailbyte. At block 1614 CJK Head byte and 2 tailbytes. At block 1616 First code pair Second code pair exists (1 head byte and 3 tail bytes). At block 1618 Second code pair Invalid without leading first. At block 1620 Convert to head and tail byte(s). At block 1622 Copy to target stream. At block 1624 Transform to Replacement Character 0xFFFD using 3 bytes.

Figure 17:
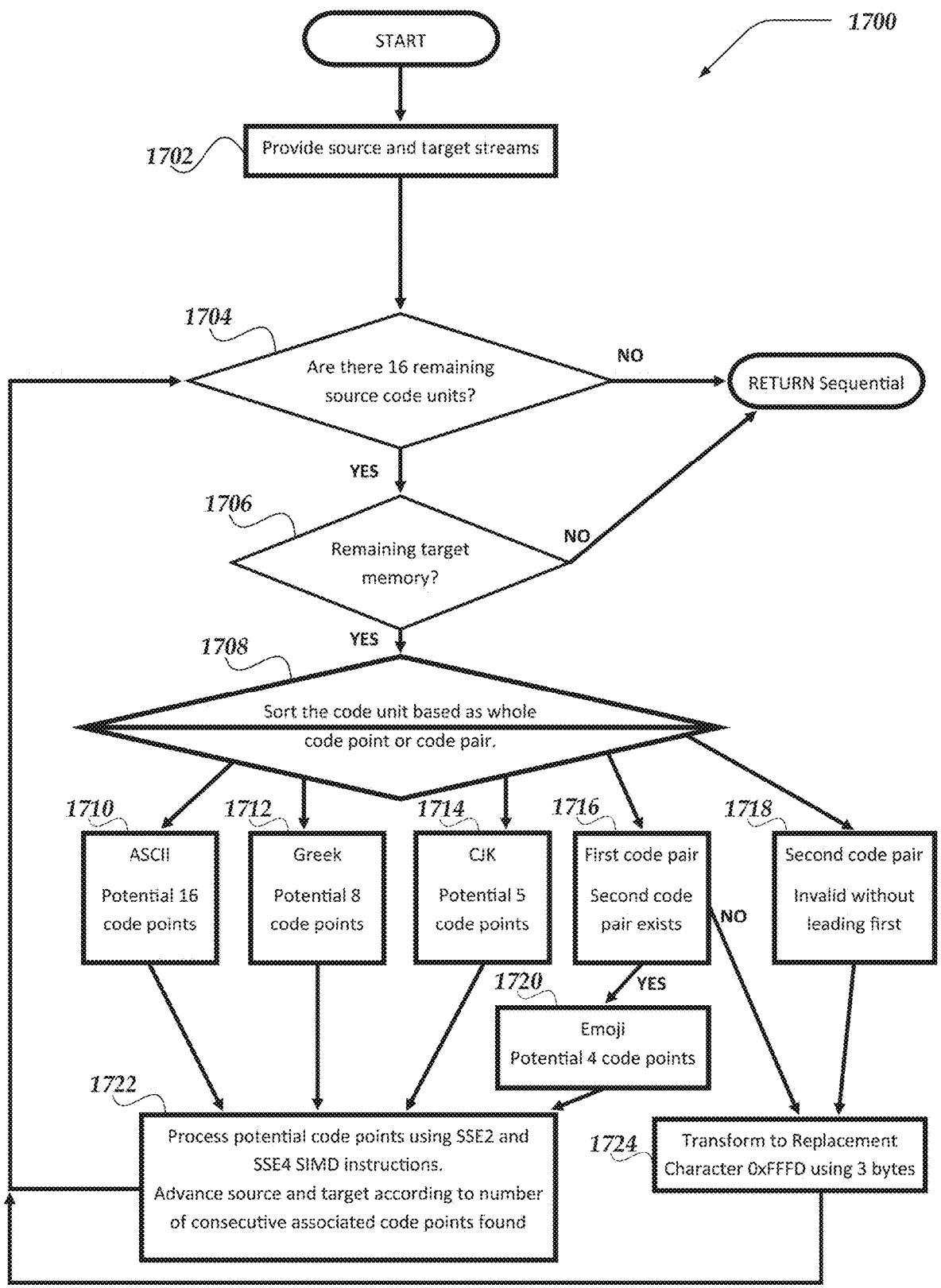
FIG. 17 illustrates a flowchart for a process for SSE4 128-bit UTF-16 source to UTF-8 target.

FIG. 17 illustrates a flowchart for process 1700 for SSE4 128-bit UTF-16 source to UTF-8 target. At block 1702 provide source and target streams. At block 1704, are there 16 remaining source code units? At block 1706, remaining target memory? At block 1708 sort the code unit based as whole code point or code pair. At block 1710, ASCII, potential 16 code points. At block 1712, Greek, potential 8 code points. At block 1714, CJK, potential 5 code points. At block 1716, first code pair Second code pair exists. At block 1718, second code pair Invalid without leading first. At block 1720, Emoji, potential 4 code points. At block 1722, process potential code points using SSE2 and SSE4 SIMD instructions. Advance source and target according to number of consecutive associated code points found. At block 1724, transform to Replacement Character 0xFFFD using 3 bytes.

Figure 18:
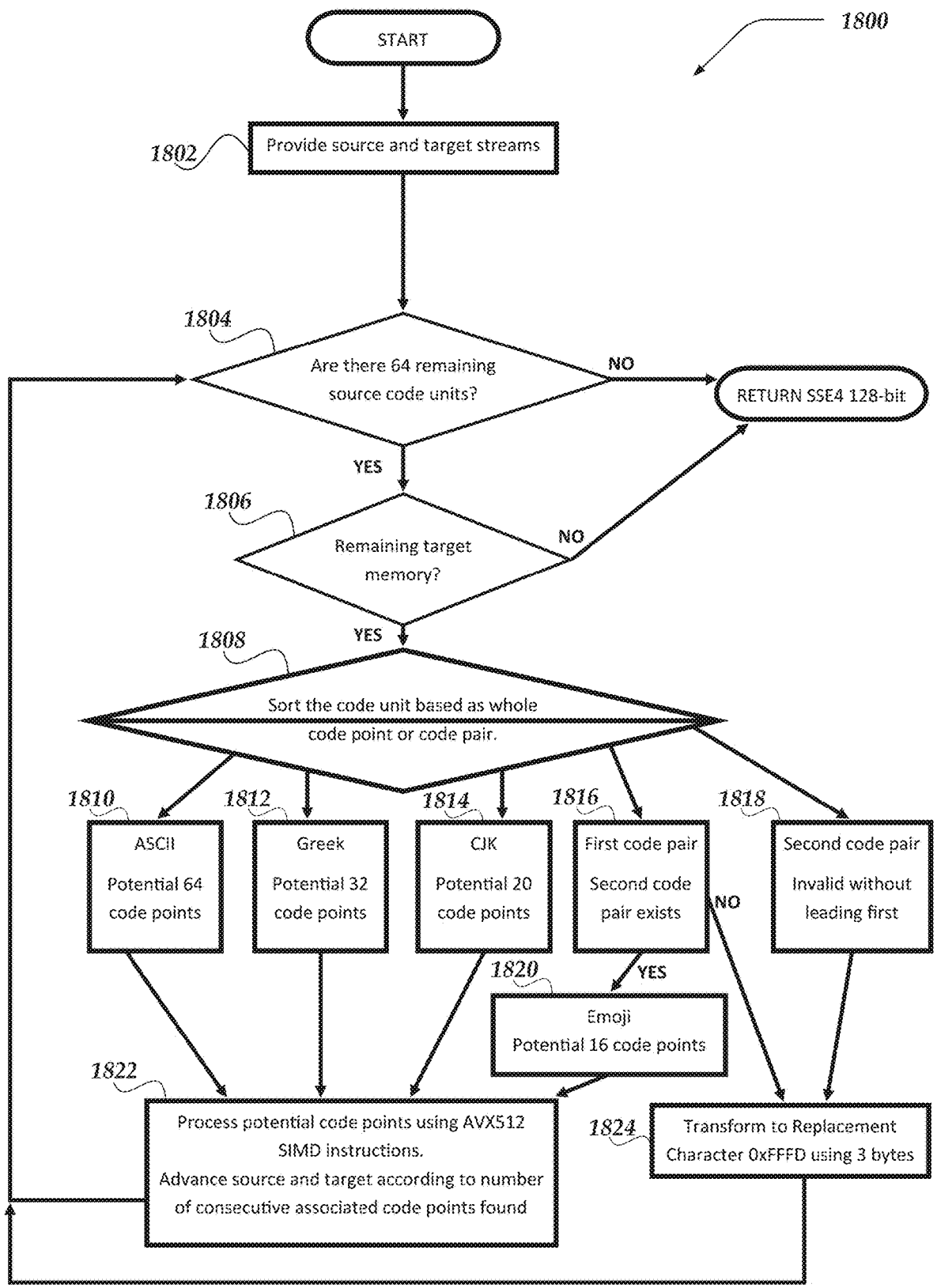
FIG. 18 illustrates a flowchart for a process for AVX-512 512-bit UTF-16 source to UTF-8 target in accordance with one or more of the various embodiments.

FIG. 18 illustrates a flowchart for process 1800 for AVX512-bit UTF-16 source to UTF-8 target in accordance with one or more of the various embodiments. At block 1802, provide source and target streams. At block 1804, are there 64 remaining source code units? At block 1806, Remaining target memory? At block 1808, sort the code unit based as whole code point or code pair. At block 1810, ASCII, potential 64 code points. At block 1812, Greek, potential 32 code points. At block 1814, CJK, potential 20 code points. At block 1816, First code pair, second code pair exists. At block 1818, Second code pair, invalid without leading first. At block 1820, Emoji, potential 16 code points. At block 1822, process potential code points using AVX512 SIMD instructions. Advance source and target according to number of consecutive associated code points found. At block 1824, transform to Replacement Character 0xFFFD using 3 bytes.

Figure 19:
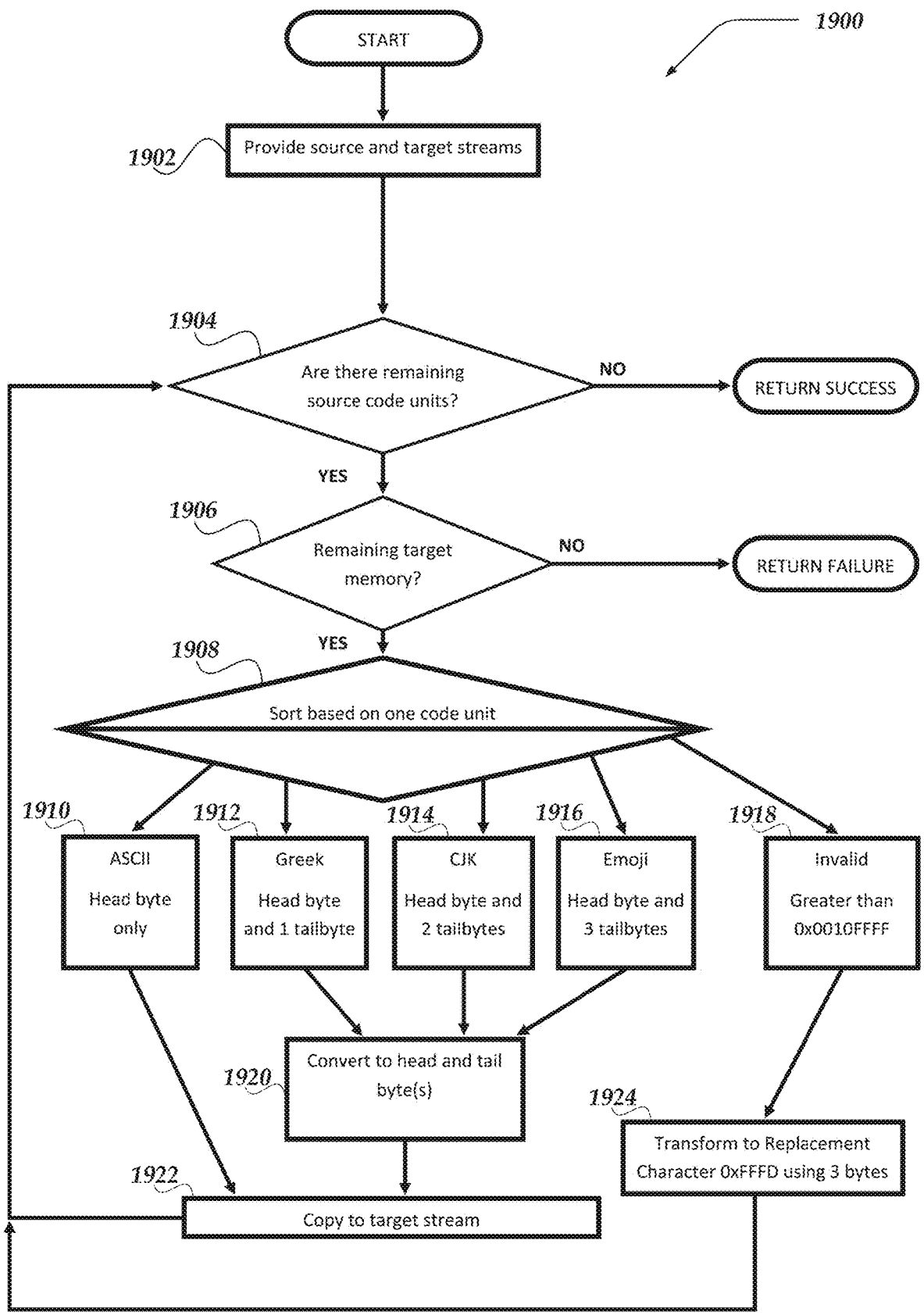
FIG. 19 illustrates a flowchart for a process for sequential single code unit (current) UTF-32 source to UTF-8 target.

FIG. 19 illustrates a flowchart for process 1900 for sequential single code unit (current) UTF-32 source to UTF-8 target. At block 1902, provide source and target streams. At block 1904, are there remaining source code units? At block 1906, remaining target memory? At block 1908, sort based on one code unit. At block 1910, ASCII, head byte only. At block 1912, Greek, head byte and 1 tailbyte. At block 1914, CJK, head byte and 2 tailbytes. At block 1916, Emoji, head byte and 3 tailbytes. At block 1918, Invalid, Greater than 0x0010FFFF. At block 1920, convert to head and tail byte(s). At block 1922 copy to target stream. At block 1924, transform to Replacement Character 0xFFFD using 3 bytes.

Figure 20:
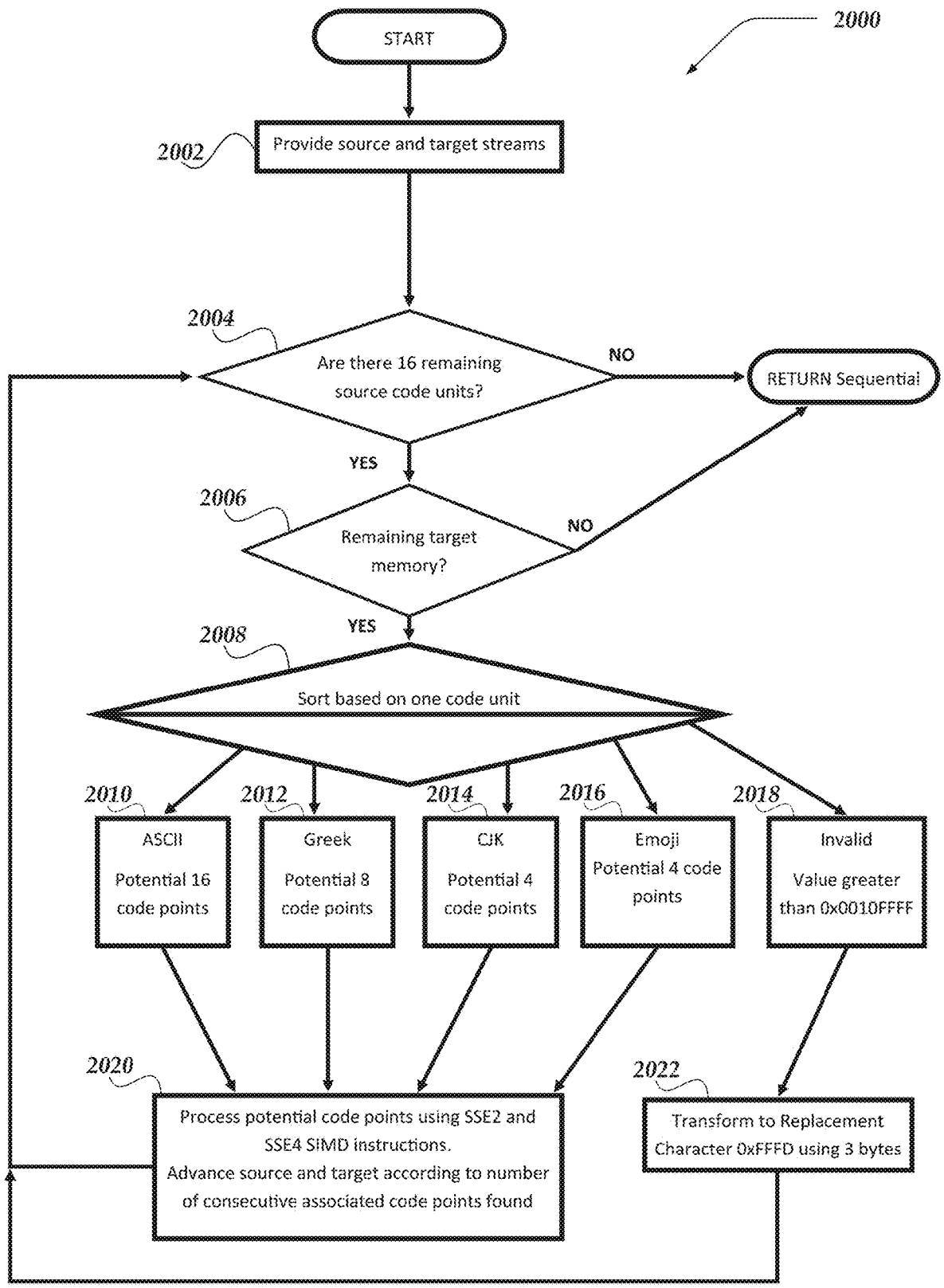
FIG. 20 illustrates a flowchart for a process for SSE4 128-bit UTF-32 source to UTF-8 target in accordance with one or more of the various embodiments.

FIG. 20 illustrates a flowchart for process 2000 for SSE4 128-bit UTF-32 source to UTF-8 target in accordance with one or more of the various embodiments. At block 2002, provide source and target streams. At block 2004, are there 16 remaining source code units? At block 2006, remaining target memory? At block 2008, sort based on one code unit. At block 2010, ASCII, potential 16 code points. At block 2012, Greek, potential 8 code points. At block 2014, CJK, potential 4 code points. At block 2016, Emoji, potential 4 code points. At block 2018, Invalid Value, greater than 0x0010FFFF. At block 2020, process potential code points using SSE2 and SSE4 SIMD instructions. Advance source and target according to number of consecutive associated code points found. At block 2022 transform to Replacement Character 0xFFFD using 3 bytes.

Figure 21:
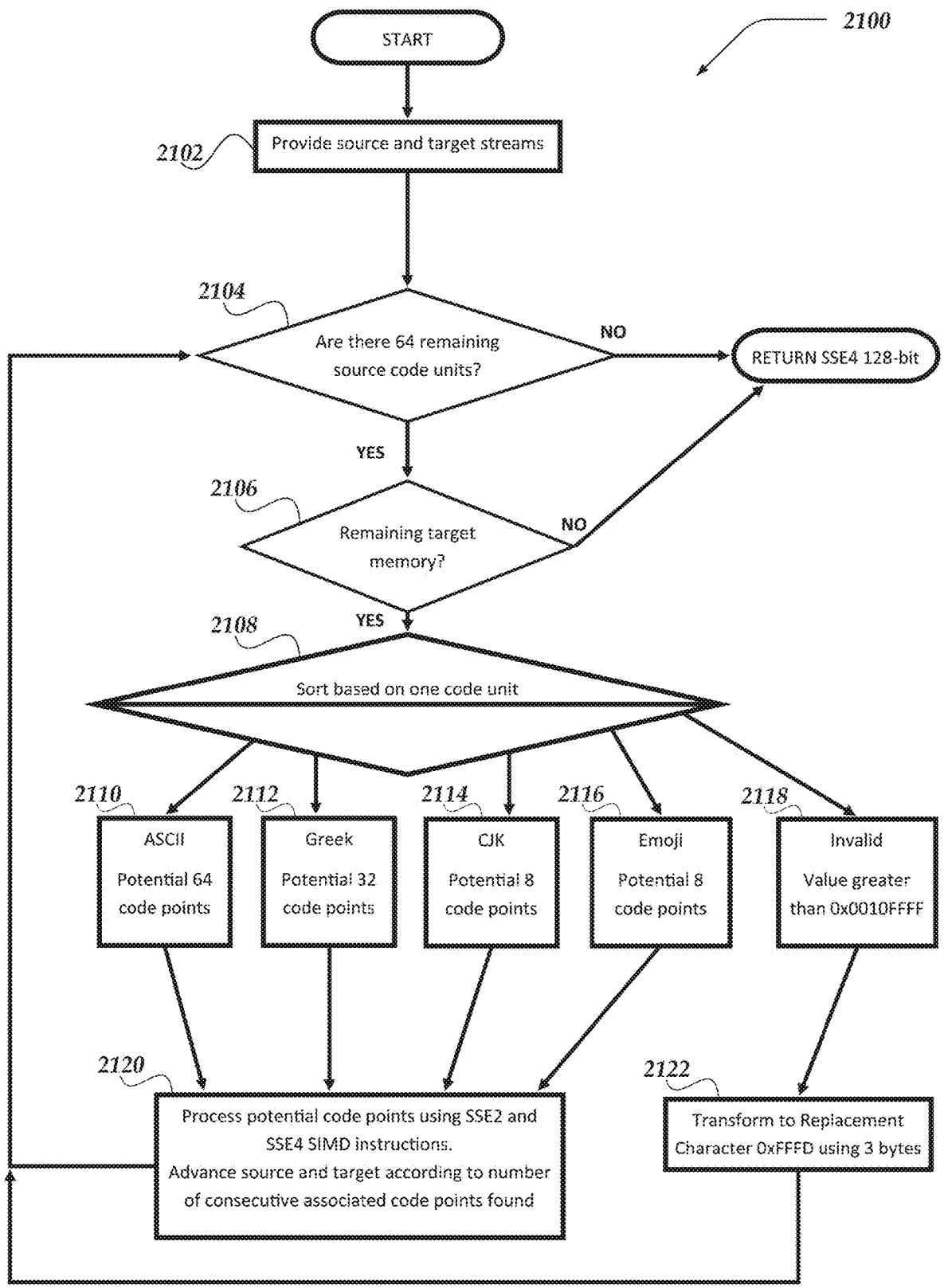
FIG. 21 illustrates a flowchart for a process for AVX512-bit UTF-32 source to UTF-8 target in accordance with one or more of the various embodiments.

FIG. 21 illustrates a flowchart for process 2100 for AVX512-bit UTF-32 source to UTF-8 target in accordance with one or more of the various embodiments. At block 2102 provide source and target streams. At block 2104, are there 64 remaining source code units? At block 2106, remaining target memory? At block 2108, sort based on one code unit. At block 2110, ASCII, potential 64 code points. At block 2112, Greek, potential 32 code points. At block 2114, CJK, potential 8 code points. At block 2116, Emoji, potential 8 code points. At block 2118, Invalid Value, greater than 0x0010FFFF. At block 2120, process potential code points using SSE2 and SSE4 SIMD instructions. Advance source and target according to number of consecutive associated code points found. At block 2122, transform to Replacement Character 0xFFFD using 3 bytes.

Figure 22:
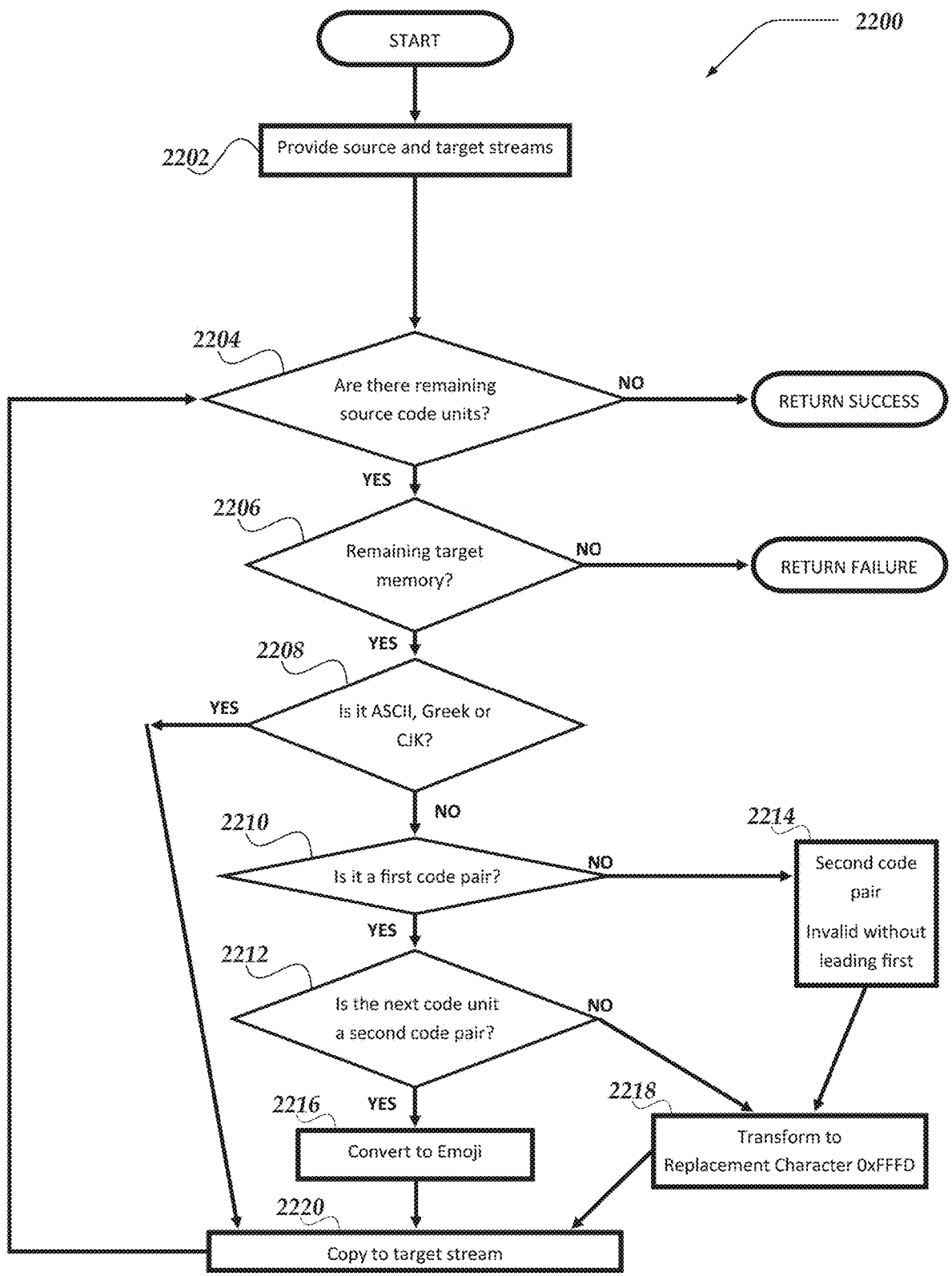
FIG. 22 illustrates a flowchart for a process 0 for sequential single code unit (current) UTF-16 source to UTF-32 target.

FIG. 22 illustrates a flowchart for process 2200 for Sequential single code unit (current) UTF-16 source to UTF-32 target. At block 2202, provide source and target streams. At block 2204, are there remaining source code units? At block 2206, remaining target memory? At block 2208, is it ASCII, Greek or CJK? At block 2210, is it a first code pair? At block 2212, is the next code unit a second code pair? At block 2214, second code pair Invalid without leading first. At block 2216, convert to Emoji. At block 2218, transform to Replacement Character 0xFFFD. At block 2220, copy to target stream.

Figure 23:
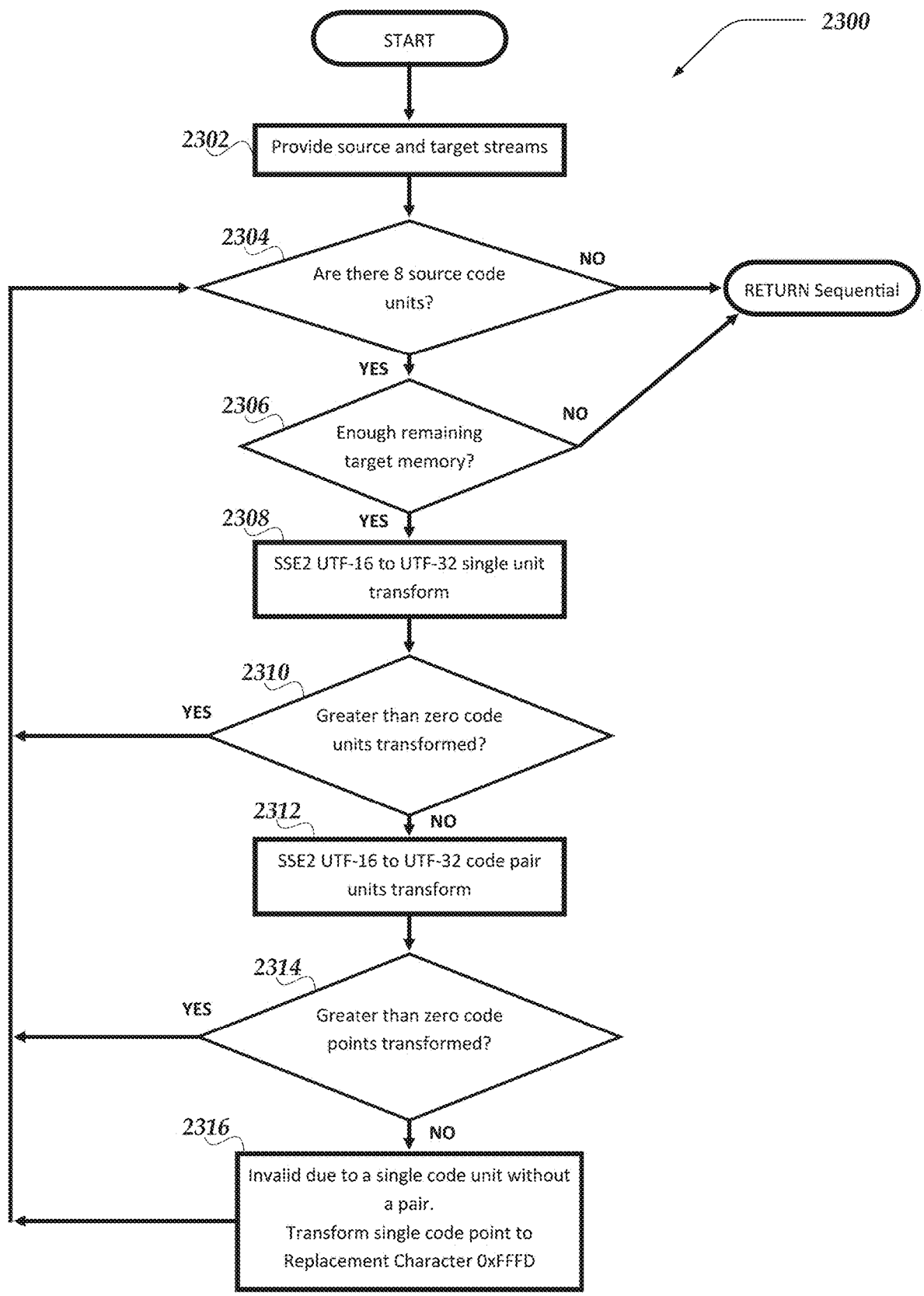
FIG. 23 illustrates a flowchart for a process for SSE2 128-bit UTF-16 source to UTF-32 target.

FIG. 23 illustrates a flowchart for process 2300 for SSE2 128-bit UTF-16 source to UTF-32 target. At block 2302, provide source and target streams. At block 2304, are there 8 source code units? At block 2306, enough remaining target memory? At block 2308, SSE2 UTF-16 to UTF-32 single unit transform. At block 2310, Greater than zero code units transformed? At block 2312, SSE2 UTF-16 to UTF-32 code pair units transform. At block 2314, greater than zero code points transformed? At block 2316 Invalid due to a single code unit without a pair. Transform single code point to Replacement Character 0xFFFD.

Figure 24:
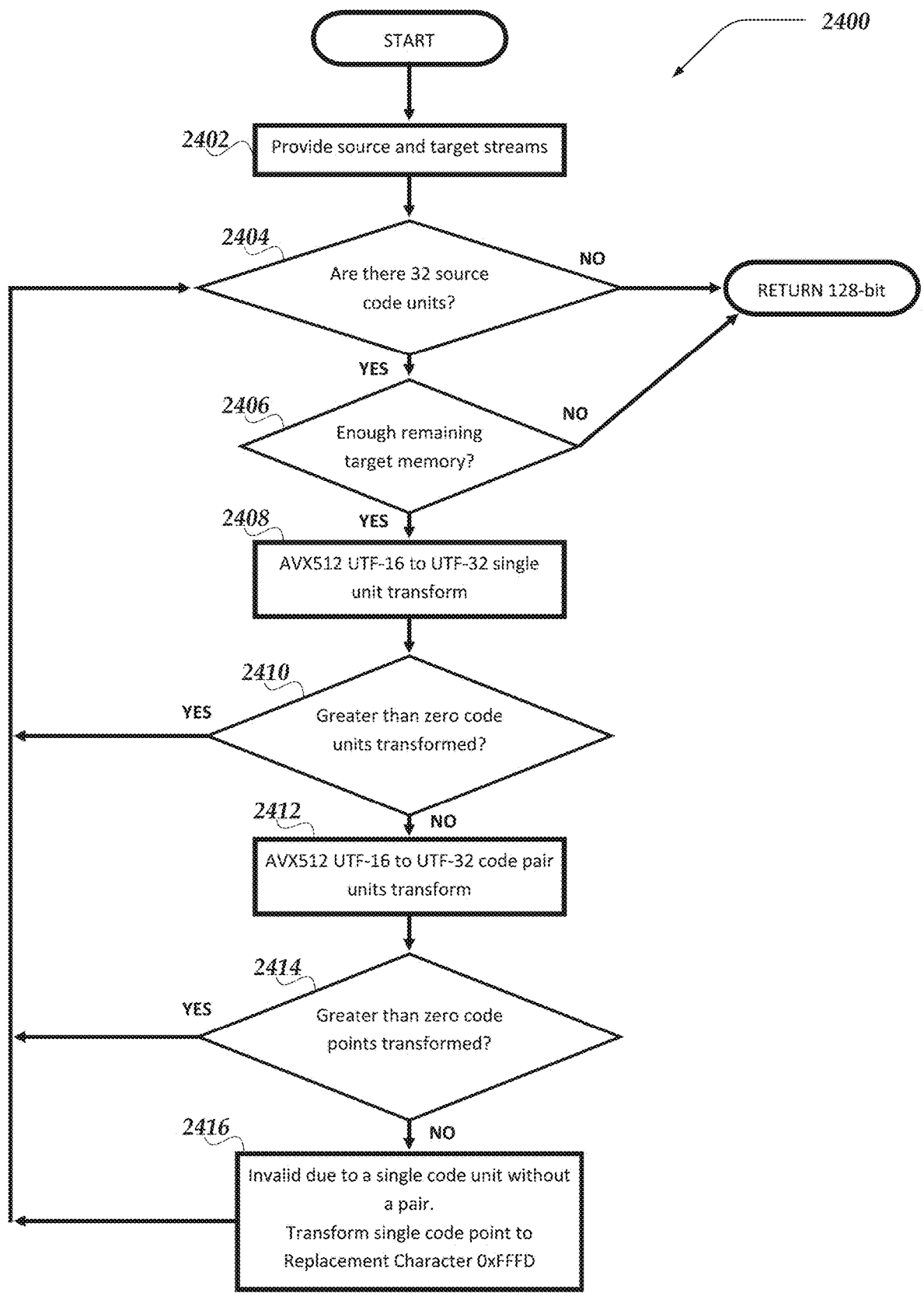
FIG. 24 illustrates a flowchart for a process for AVX-512 512-bit UTF-16 source to UTF-32 target in accordance with one or more of the various embodiments.

FIG. 24 illustrates a flowchart for process 2400 for AVX512-bit UTF-16 source to UTF-32 target in accordance with one or more of the various embodiments. At block 2402, provide source and target streams. At block 2404, are there 32 source code units? At block 2406, enough remaining target memory? At block 2408, AVX512 UTF-16 to UTF-32 single unit transform. At block 2410, greater than zero code units transformed? At block 2412 AVX512 UTF-16 to UTF-32 code pair units transform. At block 2414, greater than zero code points transformed? At block 2416, invalid due to a single code unit without a pair. Transform single code point to Replacement Character 0xFFFD.

Figure 25:
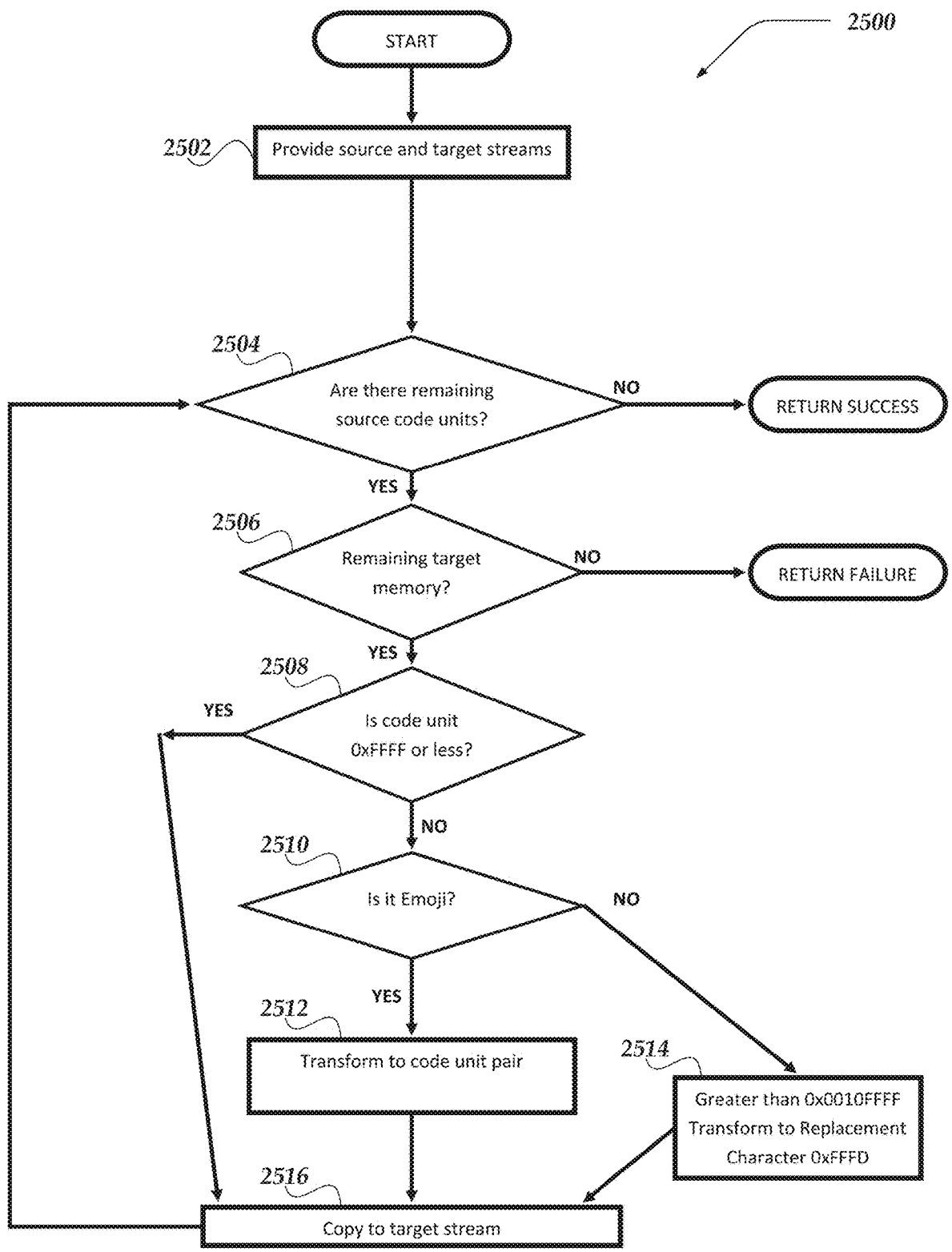
FIG. 25 illustrates a flowchart for a process for Sequential single code unit UTF-32 source to UTF-16 target.

FIG. 25 illustrates a flowchart for process 2500 for Sequential single code unit UTF-32 source to UTF-16 target. At block 2502, provide source and target streams. At block 2504, are there remaining source code units? At block 2506, remaining target memory? At block 2508, is code unit 0xFFFF or less? At block 2510, is it Emoji? At block 2512, transform to code unit pair. At block 2514, greater than 0x0010FFFF. Transform to Replacement Character0xFFFD. At block 2516 Copy to target stream.

Figure 26:
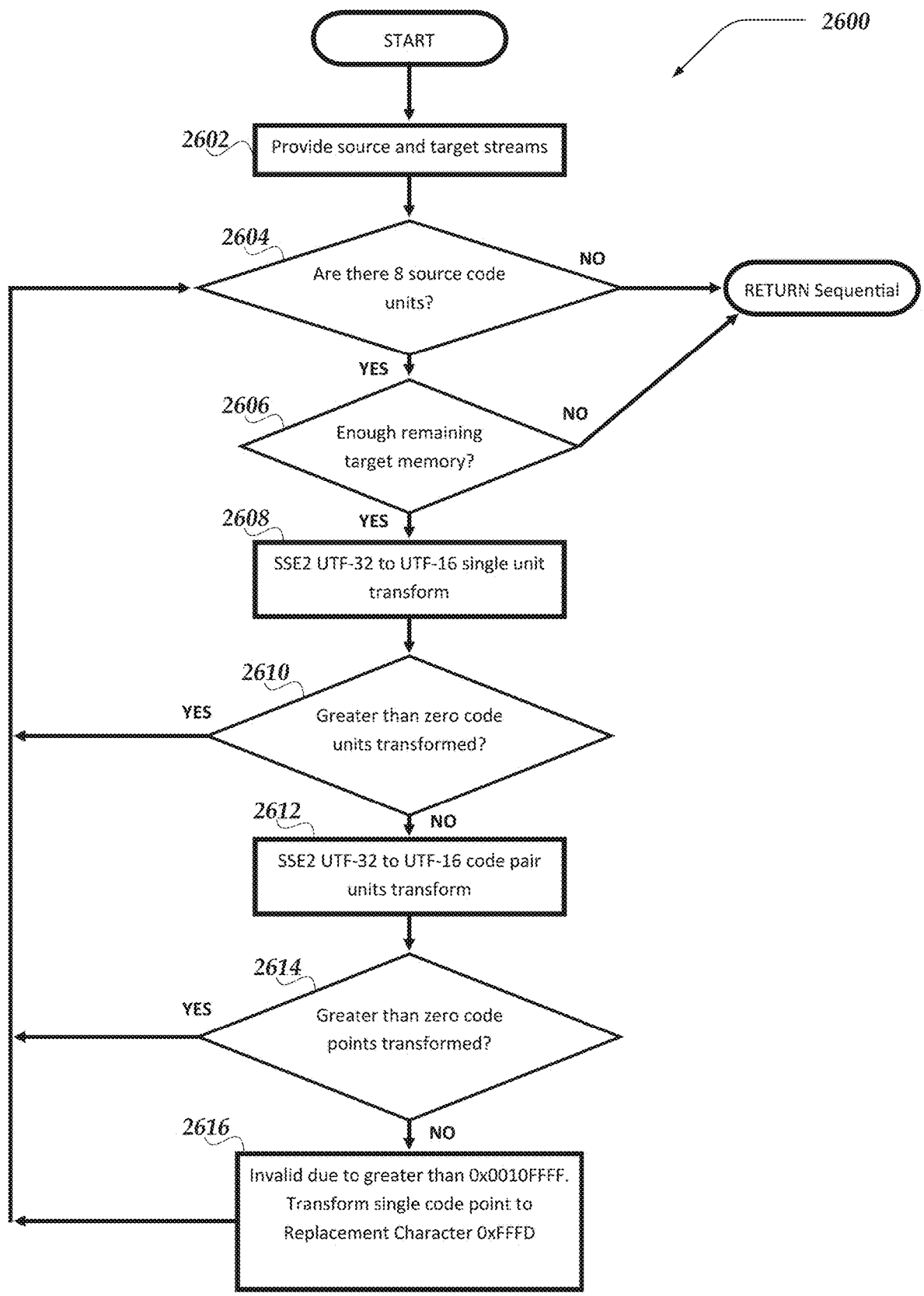
FIG. 26 illustrates a flowchart for a process for SSE2 128-bit UTF-32 source to UTF-16 target in accordance with one or more of the various embodiments.

FIG. 26 illustrates a flowchart for process 2600 for SSE2 128-bit UTF-32 source to UTF-16 target in accordance with one or more of the various embodiments. At block 2602, provide source and target streams. At block 2604, are there 8 source code units? At block 2606, enough remaining target memory? At block 2608 SSE2 UTF-32 to UTF-16 single unit transform. At block 2610, greater than zero code units transformed? At block 2612 SSE2 UTF-32 to UTF-16 code pair units transform. At block 2614 Greater than zero code points transformed? At block 2616, invalid due to greater than 0x0010FFFF. Transform single code point to Replacement Character 0xFFFD.

Figure 27:
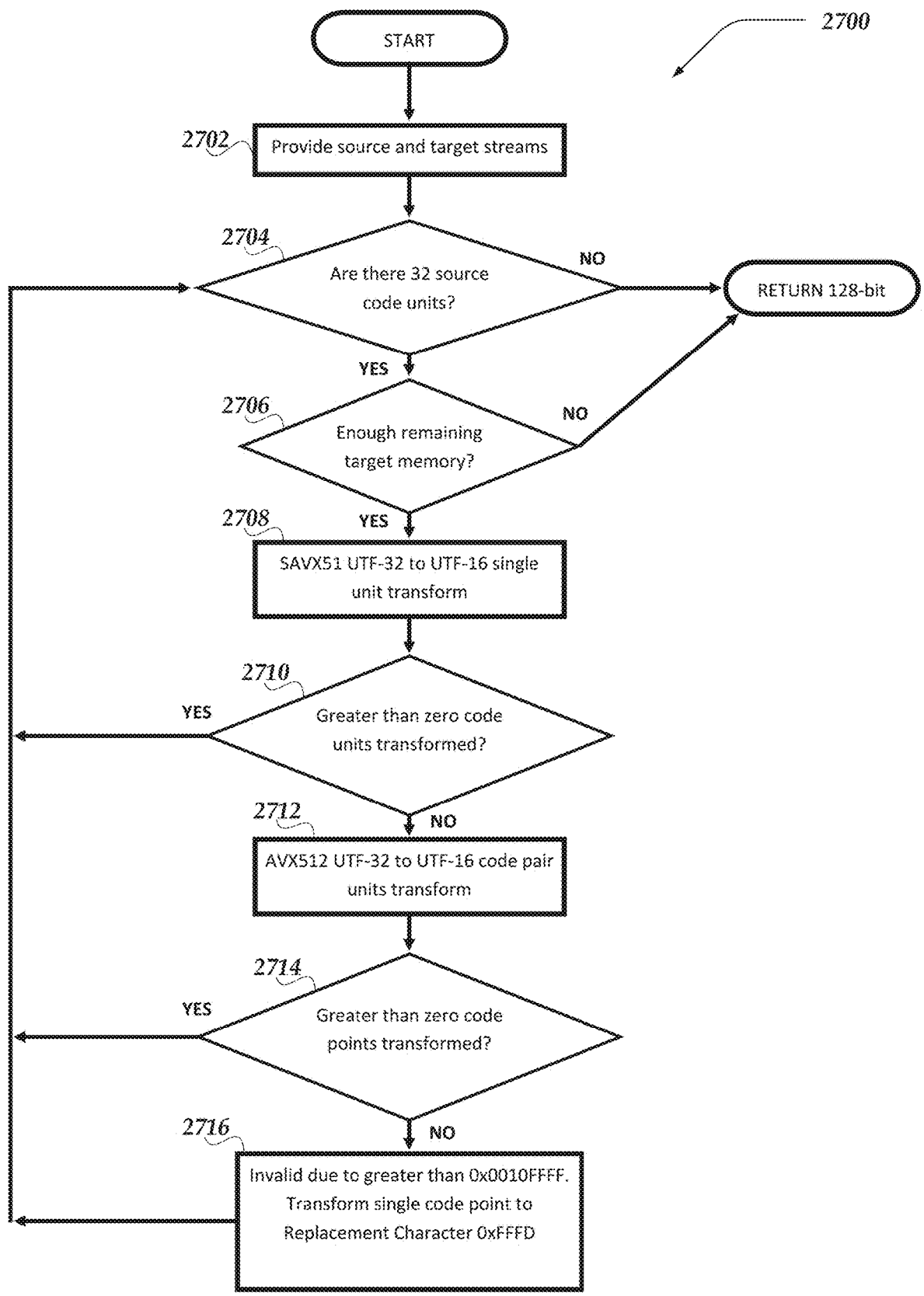
FIG. 27 illustrates a flowchart for a process for AVX-512 512-bit UTF-32 source to UTF-16 target in accordance with one or more of the various embodiments.

FIG. 27 illustrates a flowchart for process 2700 for AVX512 128-bit UTF-32 source to UTF-16 target in accordance with one or more of the various embodiments. At block 2702, provide source and target streams. At block 2704, are there 32 source code units? At block 2706, enough remaining target memory? At block 2708, SAVX51 UTF-32 to UTF-16 single unit transform. At block 2710, Greater than zero code units transformed? At block 2712, AVX512 UTF-32 to UTF-16 code pair units transform. At block 2714, greater than zero code points transformed? At block 2716, Invalid due to greater than 0x0010FFFF. Transform single code point to Replacement Character 0xFFFD.

It will be understood that each block in each flowchart illustration, and combinations of blocks in each flowchart illustration, can be implemented by computer program instructions. These program instructions may be provided to a processor to produce a machine, such that the instructions, which execute on the processor, create means for implementing the actions specified in each flowchart block or blocks. The computer program instructions may be executed by a processor to cause a series of operational steps to be performed by the processor to produce a computer-implemented process such that the instructions, which execute on the processor, provide steps for implementing the actions specified in each flowchart block or blocks. The computer program instructions may also cause at least some of the operational steps shown in the blocks of each flowchart to be performed in parallel. Moreover, some of the steps may also be performed across more than one processor, such as might arise in a multi-processor computer system. In addition, one or more blocks or combinations of blocks in each flowchart illustration may also be performed concurrently with other blocks or combinations of blocks, or even in a different sequence than illustrated without departing from the scope or spirit of the invention.

Accordingly, each block in each flowchart illustration supports combinations of means for performing the specified actions, combinations of steps for performing the specified actions and program instruction means for performing the specified actions. It will also be understood that each block in each flowchart illustration, and combinations of blocks in each flowchart illustration, can be implemented by special purpose hardware-based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external

What is claimed as new and desired to be protected by Letters Patent of the United States is:

1. A method for managing character encoding using one or more network computers that include one or more processors that perform actions, comprising:
 providing a plurality of characters that are each encoded as one or more code units based on a character code, wherein the one or more code units for each character represents a code point of a character encoding scheme;
 determining one or more processor features employed by each of the one or more processors to enable parallel processing of the one or more code units having a width of one byte at the same time, wherein the one or more processor features include two or more registers that include a two byte size that provides for parallel processing of three or more code units representing a complete character;
 determining an encoding model based on the character code, the one or more processor features, and a target character code;
 employing the one or more processor features to transform the one or more code units into one or more target code units based on the encoding model, wherein the one or more target code units are based on the target character code, and wherein the one or more target code units encode the code point for each character; and
 providing the plurality of target characters to a target stream, wherein each target character is encoded as the one or more target code units.

2. The method of claim 1, wherein employing the one or more processor features to transform the one or more code units into the one or more target code units, further comprises:
 determining one or more instructions associated with the one or more processor features based on the encoding model; and
 executing the one or more instructions to simultaneously transform one or more portions of the one or code units into one or more portions of the one or more target code units.

3. The method of claim 1, wherein the transforming of the one or more code units into the one or more target code units, further comprises:
 wherein the two or more registers include a first register, a second register and a third registers;
 loading a first register with a first portion of the one or more code units, wherein each code unit is two bytes wide;
 loading a second register with a second portion of the one or more code units, wherein each code unit is two bytes wide, and wherein the second register is the same width as the first register; and
 providing the one or more target code units based on packing the first portion of the one or more code units and the second portion of the one or more code units into a third register, wherein each target code unit is one byte wide, and wherein the third register is the same width as the first register.

4. The method of claim 1, wherein the transforming the one or more code units into the one or more target code units, further comprises:
 loading the one or more code units into a register, wherein each code unit is one byte wide, and wherein three or more code units are used to encode each code point that represents each character; and
 generating the one or more target code units in the register based on the encoding model, wherein each target code units is two bytes wide, and wherein each target code unit encodes the code point that represents each character.

5. The method of claim 1, wherein the character encoding scheme is Unicode, and wherein the character code is one or more of Unicode Transformation Format-8 bits (UTF-8), Unicode Transformation Format-16 bits (UTF-16), or Unicode Transformation Format-32 bits (UTF-32), and wherein the target character code is one or more of UTF-8, UTF-16, or UTF-32.

6. The method of claim 1, wherein determining the encoding model based on the character code, further comprises:
 categorizing the one or more code units or the one or more target code units based on a number of bytes used to represent each character, wherein each category employs the number of bytes to represent each character; and
 further determining the encoding model based on the category of the one or more code units or the one or more target code units.

7. The method of claim 1, further comprising, displaying the one or more encoded target code units in a visualization for one or more of labels, descriptions, marks, or metadata.

8. A processor readable non-transitory storage media that includes instructions for managing character encoding, wherein execution of the instructions by one or more hardware processors performs actions, comprising:
 providing a plurality of characters that are each encoded as one or more code units based on a character code, wherein the one or more code units for each character represents a code point of a character encoding scheme;
 determining one or more processor features employed by each of the one or more processors to enable parallel processing of the one or more code units having a width of one byte at the same time, wherein the one or more processor features include two or more registers that include a two byte size that provides for parallel processing of three or more code units representing a complete character;
 determining an encoding model based on the character code, the one or more processor features, and a target character code;
 employing the one or more registers to transform the one or more code units into one or more target code units that are stored in the one or more processor features based on the encoding model, wherein the one or more target code units are based on the target character code, and wherein the one or more target code units encode the code point for each character; and
 providing the plurality of target characters to a target stream, wherein each target character is encoded as the one or more target code units.

9. The media of claim 8, wherein employing the one or more processor features to transform the one or more code units into the one or more target code units, further comprises:
 determining one or more instructions associated with the one or more processor features based on the encoding model; and executing the one or more instructions to simultaneously transform one or more portions of the one or code units into one or more portions of the one or more target code units.

10. The media of claim 8, wherein the transforming of the one or more code units into the one or more target code units, further comprises:
wherein the two or more registers include a first register, a second register and a third registers;
loading a first register with a first portion of the one or more code units, wherein each code unit is two bytes wide;
loading a second register with a second portion of the one or more code units, wherein each code unit is two bytes wide, and wherein the second register is the same width as the first register; and
providing the one or more target code units based on packing the first portion of the one or more code units and the second portion of the one or more code units into a third register, wherein each target code unit is one byte wide, and wherein the third register is the same width as the first register.

11. The media of claim 8, wherein the transforming the one or more code units into the one or more target code units, further comprises:
loading the one or more code units into a register, wherein each code unit is one byte wide, and wherein three or more code units are used to encode each code point that represents each character; and
generating the one or more target code units in the register based on the encoding model, wherein each target code units is two bytes wide, and wherein each target code unit encodes the code point that represents each character.

12. The media of claim 8, wherein the character encoding scheme is Unicode, and wherein the character code is one or more of Unicode Transformation Format-8 bits (UTF-8), Unicode Transformation Format-16 bits (UTF-16), or Unicode Transformation Format-32 bits (UTF-32), and wherein the target character code is one or more of UTF-8, UTF-16, or UTF-32.

13. The media of claim 8, wherein determining the encoding model based on the character code, further comprises:
categorizing the one or more code units or the one or more target code units based on a number of bytes used to represent each character, wherein each category employs the number of bytes to represent each character; and
further determining the encoding model based on the category of the one or more code units or the one or more target code units.

14. A system for managing character encoding, comprising:
a network computer, comprising:
a memory that stores at least instructions; and
one or more processors that execute instructions that perform actions, including:
providing a plurality of characters that are each encoded as one or more code units based on a character code, wherein the one or more code units for each character represents a code point of a character encoding scheme;
determining one or more processor features employed by each of the one or more processors to enable parallel processing of the one or more code units having a width of one byte at the same time, wherein the one or more processor features include one two or more registers that include a two byte size that provides for parallel processing of three or more code units representing a complete character;
determining an encoding model based on the character code, the one or more registers, and a target character code;
employing the one or more process features to transform the one or more code units into one or more target code units that are stored in the one or more process features based on the encoding model, wherein the one or more target code units are based on the target character code, and wherein the one or more target code units encode the code point for each character; and
providing the plurality of target characters to a target stream, wherein each target character is encoded as the one or more target code units; and
a client computer, comprising:
another memory that stores at least instructions; and
one or more other processors that execute instructions that perform actions, including:
providing one or more of the plurality of characters or the target stream.

15. The system of claim 14, wherein employing the one or more processor features to transform the one or more code units into the one or more target code units, further comprises:
determining one or more instructions associated with the one or more processor features based on the encoding model; and
executing the one or more instructions to simultaneously transform one or more portion of the one or code units into one or more portions of the one or more target code units.

16. The system of claim 14, wherein the transforming of the one or more code units into the one or more target code units, further comprises:
wherein the two or more registers include a first register, a second register and a third registers;
loading a first register with a first portion of the one or more code units, wherein each code unit is two bytes wide;
loading a second register with a second portion of the one or more code units, wherein each code unit is two bytes wide, and wherein the second register is the same width as the first register; and
providing the one or more target code units based on packing the first portion of the one or more code units and the second portion of the one or more code units into a third register, wherein each target code unit is one byte wide, and wherein the third register is the same width as the first register.

17. The system of claim 14, wherein the transforming the one or more code units into the one or more target code units, further comprises:
loading the one or more code units into a register, wherein each code unit is one byte wide, and wherein three or more code units are used to encode each code point that represents each character; and
generating the one or more target code units in the register based on the encoding model, wherein each target code units is two bytes wide, and wherein each target code unit encodes the code point that represents each character.

18. The system of claim 14, wherein the character encoding scheme is Unicode, and wherein the character code is one or more of Unicode Transformation Format-8 bits (UTF-8), Unicode Transformation Format-16 bits (UTF-16), or Unicode Transformation Format-32 bits (UTF-32), and wherein the target character code is one or more of UTF-8, UTF-16, or UTF-32.

19. The system of claim 14, wherein determining the encoding model based on the character code, further comprises:
   categorizing the one or more code units or the one or more target code units based on a number of bytes used to represent each character, wherein each category employs the number of bytes to represent each character; and
   further determining the encoding model based on the category of the one or more code units or the one or more target code units.

20. The system of claim 14, further comprising, displaying the one or more encoded target code units in a visualization for one or more of labels, descriptions, marks, or metadata.

\* \* \* \* \*